United States Patent
Sato et al.

(10) Patent No.: US 10,540,117 B2
(45) Date of Patent: Jan. 21, 2020

(54) STORAGE SYSTEM INCLUDING A PLURALITY OF NETWORKED STORAGE NODES

(71) Applicant: TOSHIBA MEMORY CORPORATION, Tokyo (JP)

(72) Inventors: Yoshiei Sato, Ota Tokyo (JP); Mototaka Kanematsu, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 212 days.

(21) Appl. No.: 15/438,427

(22) Filed: Feb. 21, 2017

(65) Prior Publication Data
US 2018/0067695 A1 Mar. 8, 2018

(30) Foreign Application Priority Data
Sep. 5, 2016 (JP) .................................. 2016-172866

(51) Int. Cl.
*G06F 13/00* (2006.01)
*G06F 3/06* (2006.01)

(52) U.S. Cl.
CPC ............ *G06F 3/0659* (2013.01); *G06F 3/067* (2013.01); *G06F 3/0613* (2013.01)

(58) Field of Classification Search
CPC ...... G06F 3/067; G06F 3/0646; G06F 3/0613; G06F 3/0659
USPC .......... 711/103; 710/103; 712/103; 707/103; 717/103
See application file for complete search history.

(56) References Cited

U.S. PATENT DOCUMENTS

| 8,631,189 | B2 | 1/2014 | Kawamura et al. |
| 8,904,090 | B2 | 12/2014 | Baek et al. |
| 2009/0138570 | A1* | 5/2009 | Miura ................. G06F 13/1673 709/217 |
| 2012/0075743 | A1* | 3/2012 | Horiguchi ............... H04L 47/18 360/75 |
| 2013/0111153 | A1* | 5/2013 | Lee .......................... G06F 3/067 711/154 |
| 2014/0201439 | A1* | 7/2014 | Sasaki ................. G06F 11/1092 711/114 |

(Continued)

FOREIGN PATENT DOCUMENTS

| JP | 2011192240 A | 9/2011 |
| JP | 2013137665 A | 7/2013 |
| JP | 2015179425 A | 10/2015 |

*Primary Examiner* — Charles Rones
*Assistant Examiner* — Han V Doan
(74) *Attorney, Agent, or Firm* — Kim & Stewart LLP

(57) ABSTRACT

A storage system includes a plurality of nodes, each of the nodes including a nonvolatile storage device, and a connection unit directly connected to at least one of the nodes. The connection unit is configured to determine a target node responsive to a write request generated by a host, determine whether or not the target node is busy, output a write command directed to a non-busy node such that data requested by the write request are written in the non-busy node, responsive to determining that the target node is busy, and output a copy command directed to the non-busy node such that the data written in the non-busy node are copied to the target node, after a reference time period has passed since determining that the target node is busy.

14 Claims, 17 Drawing Sheets

(56) References Cited

U.S. PATENT DOCUMENTS

2015/0058436 A1* 2/2015 Kurita ................... G06F 15/167
709/213
2015/0268867 A1   9/2015 Oe et al.
2015/0350085 A1* 12/2015 Soumiya ............... H04L 45/125
370/232

* cited by examiner

| NMID | AVERAGE WRITE TIME | ... |
|---|---|---|
| ... | ... | ... |
| ... | ... | ... |
| ⋮ | ⋮ | ⋮ |

| ENTRY ID | SOURCE ADDRESS | SAVE DESTINATION ADDRESS | COPY-COMPLETION FLAG |
|---|---|---|---|
| 0 | 0x010001 | 0x02A001 | False |
| 1 | 0x010123 | 0x02A123 | False |
| ⋮ | ⋮ | ⋮ | ⋮ |

STORAGE SYSTEM INCLUDING A PLURALITY OF NETWORKED STORAGE NODES

This application is based upon and claims the benefit of priority from Japanese Patent Application No. 2016-172866, filed Sep. 5, 2016, the entire contents of which are incorporated herein by reference.

FIELD

Embodiments described herein relate generally to a storage system and an input and output processing method.

BACKGROUND

As use of cloud computing spreads, demand for storage systems capable of storing large amounts of data and processing input and output of data at a high speed increases. Further, as demand for managing big data becomes more significant, the workloads on the storage systems become more significant. To meet such demands, a storage system including a plurality of storage nodes that are communicably networked is proposed. However, in such a storage system, delay of a process by one storage node may negatively affect performance of the entire storage system.

DESCRIPTION OF THE DRAWINGS

FIG. 9 illustrates a configuration of saved information used by the CU in FIG. 3.

DETAILED DESCRIPTION

An embodiment provides a storage system and an input and output processing method capable of suppressing degradation of performance.

According to an embodiment, a storage system includes a plurality of nodes communicably networked, each of the nodes including a nonvolatile storage device, and a connection unit directly connected to at least one of the nodes. The connection unit is configured to determine a target node responsive to a write request generated by a host, determine whether or not the target node is busy, output a write command directed to a non-busy node such that data requested by the write request are written in the non-busy node, responsive to determining that the target node is busy, and output a copy command directed to the non-busy node such that the data written in the non-busy node are copied to the target node, responsive to passing of a reference time period after determining that the target node is busy.

Hereinafter, embodiments will be described with reference to the drawings.

First Embodiment

A first embodiment will be described hereinafter.

Figure 1:
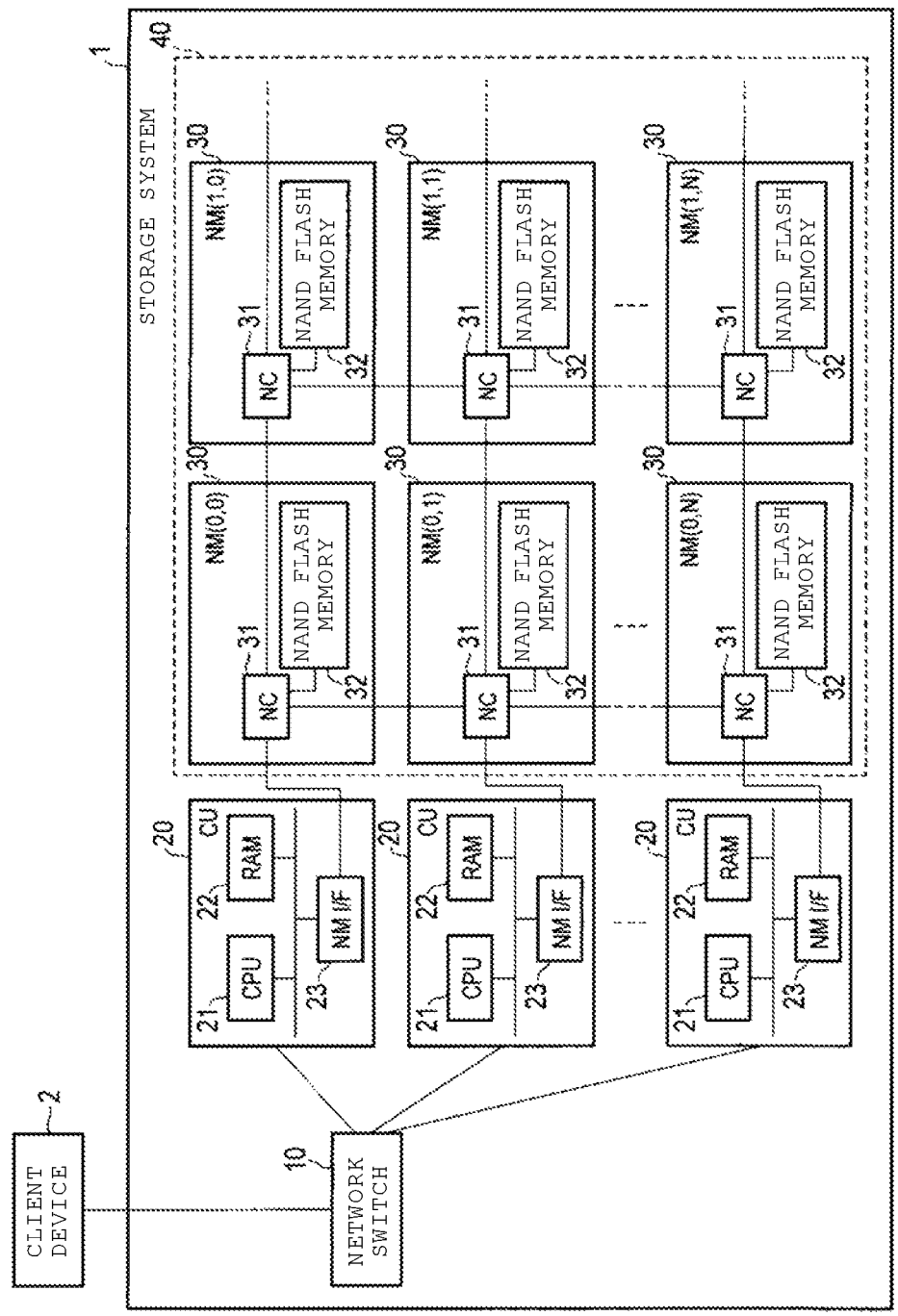
FIG. 1 illustrates a configuration of a storage system according to a first embodiment.

FIG. 1 illustrates a configuration of a storage system 1 according to the first embodiment.

The storage system 1 functions as, for example, a file server that writes data, reads data, updates data, and deletes data in response to requests from a client device 2 connected via a network. As illustrated in FIG. 1, the storage system 1 includes a network switch 10, a plurality of connection units (CUs) 20, and a plurality of node modules (NM) 30.

Each of the NMs 30 includes a node controller (NC) 31 and at least one NAND flash memory 32. The NAND flash memory 32 is, for example, an embedded multimedia card (eMMC®)). The NC 31 executes access control to the NAND flash memory 32 and transmission control of data. The NC 31 has, for example, 4-system input and output ports. Thus, for example, the plurality of NMs 30 can be connected to each other in a matrix form by connecting the NCs 31. In the storage system 1, a large-capacity data storage area 40 can be logically constructed by connecting the plurality of NMs 30.

Each of the CUs 20 executes a process of inputting or outputting data to or from the data storage area 40 (including updating of data and deleting of data) constructed as described above in response to a request from the client device 2. More specifically, the CU 20 issues an instruction to input and output data to and from a target NM 30 corresponding to a request from the client device 2, among the plurality of NMs 30. Hereinafter, a data input and output instruction issued by the CU 20 and transmitted to the NM 30 is referred to as a command in some cases.

Each of the CUs 20 includes a CPU 21, a RAM 22, and an NM interface 23. Each function of the CU 20 is performed by a program that is stored in the RAM 22 and executed by the CPU 21. The NM interface 23 executes communication with NM 30, more specifically, the NC 31 thereof. The NM interface 23 is connected to the NC 31 of any one NM 30 of the plurality of NMs 30. That is, the CU 20 is directly connected to any one NM 30 of the plurality of NMs 30 via the NM interface 23. The CU 20 is indirectly connected to the other NMs 30 via the NCs 31 of the NMs 30. The NM 30 directly connected to the CU 20 is different for each CU 20.

As described above, the CU 20 is directly connected to one NM 30 of the plurality of NMs 30. Accordingly, even when the CU 20 issues a data input and output instruction to the NMs 30 other than the directly connected NM 30, the input and output instruction is first transmitted to the directly-connected NM 30. Thereafter, the input and output instruction is transmitted up to a target NM 30 via the NC 31 of each NM 30. For example, if identifiers (M, N) are assigned to the NMs 30 according to combinations of row numbers and column numbers when the NMs 30 are connected to each other in the matrix form, the NC 31 can determine whether the input and output instruction is directed to the self-NM 30 by comparing the identifier of the self-NM 30 to the identifier designated as a transmission destination of the input and output instruction. When the input and output instruction is not directed to the self-NM 30, the NC 31 can then determine to which NM 30 the input and output instruction is transmitted among the adjacent NMs 30 from a relation between the identifier of the self-NM 30 and the identifier designated as the transmission destination of the input and output instruction, more specifically, a magnitude relation of row numbers and column numbers. A method of transmitting the input and output instruction to the target NM 30 is not limited to a predetermined method, but any existing method can be adopted. In the present example, a route to the NM 30 unselected as the transmission destination can also be used as a backup route.

A result of the input and output process according to the input and output instruction by the NM 30, that is, a result of access to the NAND flash memory 32, is also transmitted up to the CU 20 which is an issuing source of the input and output instruction via several other NMs 30 by the function of the NC 31 as in the above-described transmission of the input and output instruction. For example, by including the identifier of the NM 30 to which the CU 20 is directly connected as information regarding the issuing source of the input and output instruction, it is possible to designate this identifier as a transmission destination of a process result.

Further, the NC 31 separately has input and output ports, for example, the 4-system input and output ports, to transmit an interruption request signal, and thus a transmission route of the interruption request signal from the NM 30 to the CU 20 is dynamically determined as in the input and output instruction and the process result described above.

The network switch 10 receives a request from the client device 2 and transmits the request to one of the plurality of CUs 20. Typically, the network switch 10 distributes requests from the client device 2 to the plurality of CUs 20 so that workloads of the plurality of CUs 20 are equalized. Here, in this example, the network switch 10 is provided, but one CU 20 of the plurality of CUs 20 may operate as a master to serve as the network switch 10. The network switch 10 returns a process result received from the CU 20 to the client device 2.

Figure 2:
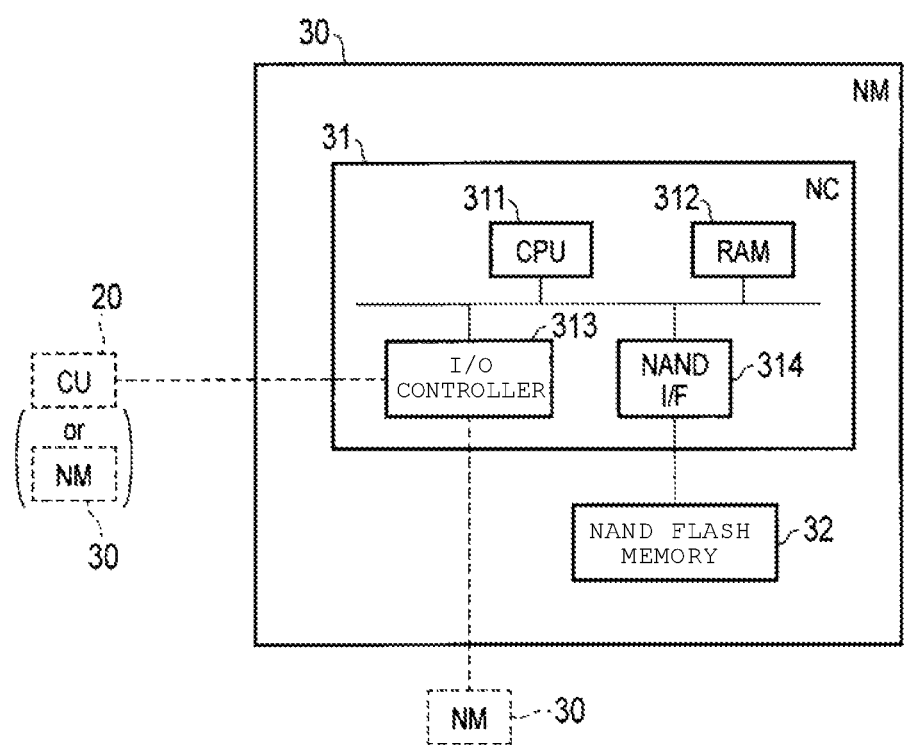
FIG. 2 illustrates a configuration of an NM (node module) of the storage system according to the first embodiment.

FIG. 2 illustrates a configuration of an NM 30 (a detailed configuration of the NC 31).

As described above, the NM 30 includes the NC 31 and at least one NAND flash memory 32. As illustrated in FIG. 2, the NC 31 includes a CPU 311, a RAM 312, an I/O controller 313, and a NAND interface 314. Each function of the NC 31 is performed by a program that is stored in the RAM 312 and executed by the CPU 311. The I/O controller 313 executes communication with the CU 20 (more specifically, the NM interface 23) or the different NM 30 (more specifically, the NC 31). The NAND interface 314 executes access to the NAND flash memory 32.

Figure 3:
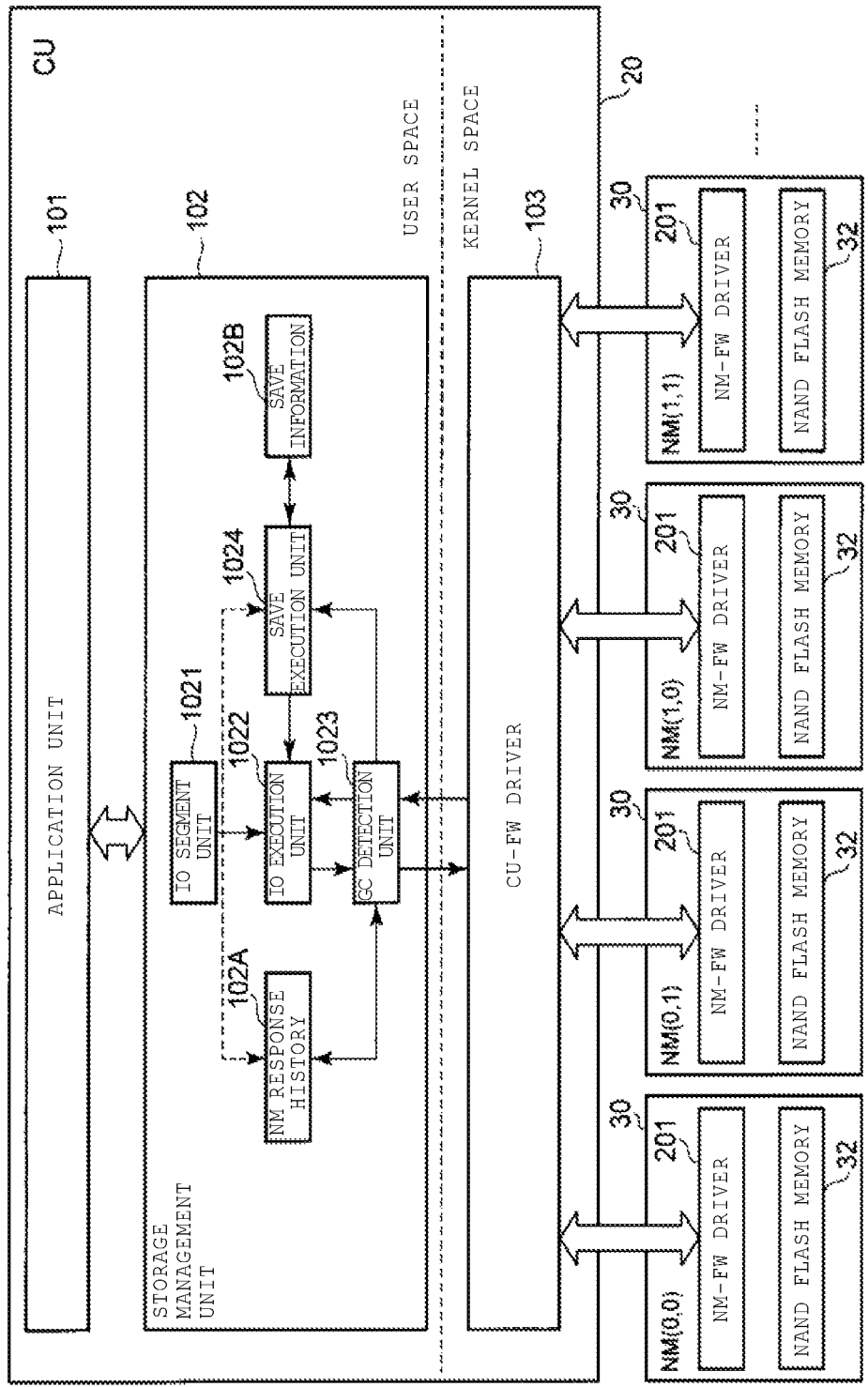
FIG. 3 illustrates an example of a functional block of a CU (connection unit) and a plurality of NMs in the storage system according to the first embodiment.

FIG. 3 illustrates an example of a functional block of the CU 20 and the NMs 30.

In the CU 20, when a program stored in the RAM 22 is executed by the CPU 21, an application unit 101 and a storage management unit 102 are configured in a user space, and a CU-FW (firmware) driver 103 is constructed in a kernel space, as illustrated in FIG. 3. On the other hand, in the NM 30, when a program stored in the RAM 312 is executed by the CPU 311, an NM-FW driver 201 is constructed, as illustrated in FIG. 3. Here, a structure other than the NM-FW driver 201 is not illustrated.

The application unit 101 receives a data input and output request from the client device 2 and outputs the input and output request to the storage management unit 102.

The storage management unit 102 has an access function of accessing the NAND flash memory 32 of the NM 30 in response to the input and output request. The storage management unit 102 issues an instruction (command) corresponding to the input and output request via the CU-FW driver 103. When the input and output request is, for example, a read request for data, the storage management unit 102 issues a read command to read data from the NAND flash memory 32 toward the NM-FW driver 201. When the input and output request is, for example, a write request for data, the storage management unit 102 issues a write command to write the data on the NAND flash memory 32 toward the NM-FW driver 201.

The NM-FW driver 201 executes an input and output process on the NAND flash memory 32 in response to the issued command.

The storage management unit 102 acquires an execution result of the input and output process by the NM-FW driver 201 via the CU-FW driver 103. The storage management unit 102 receives data read from the NAND flash memory 32 in response to, for example, a read command. The storage management unit 102 is notified that writing of data in the NAND flash memory 32 in response to, for example, a write command is completed.

The storage management unit 102 further has a save function of temporarily saving data (write data) which is to be written into one NM 30 in the different NM 30 when a process executed by the one NM 30 which can be accessed by the CU 20 is delayed. This is because the delay of the process executed by one NM 30 may degrade performance the entire system in the storage system 1.

Figure 4:
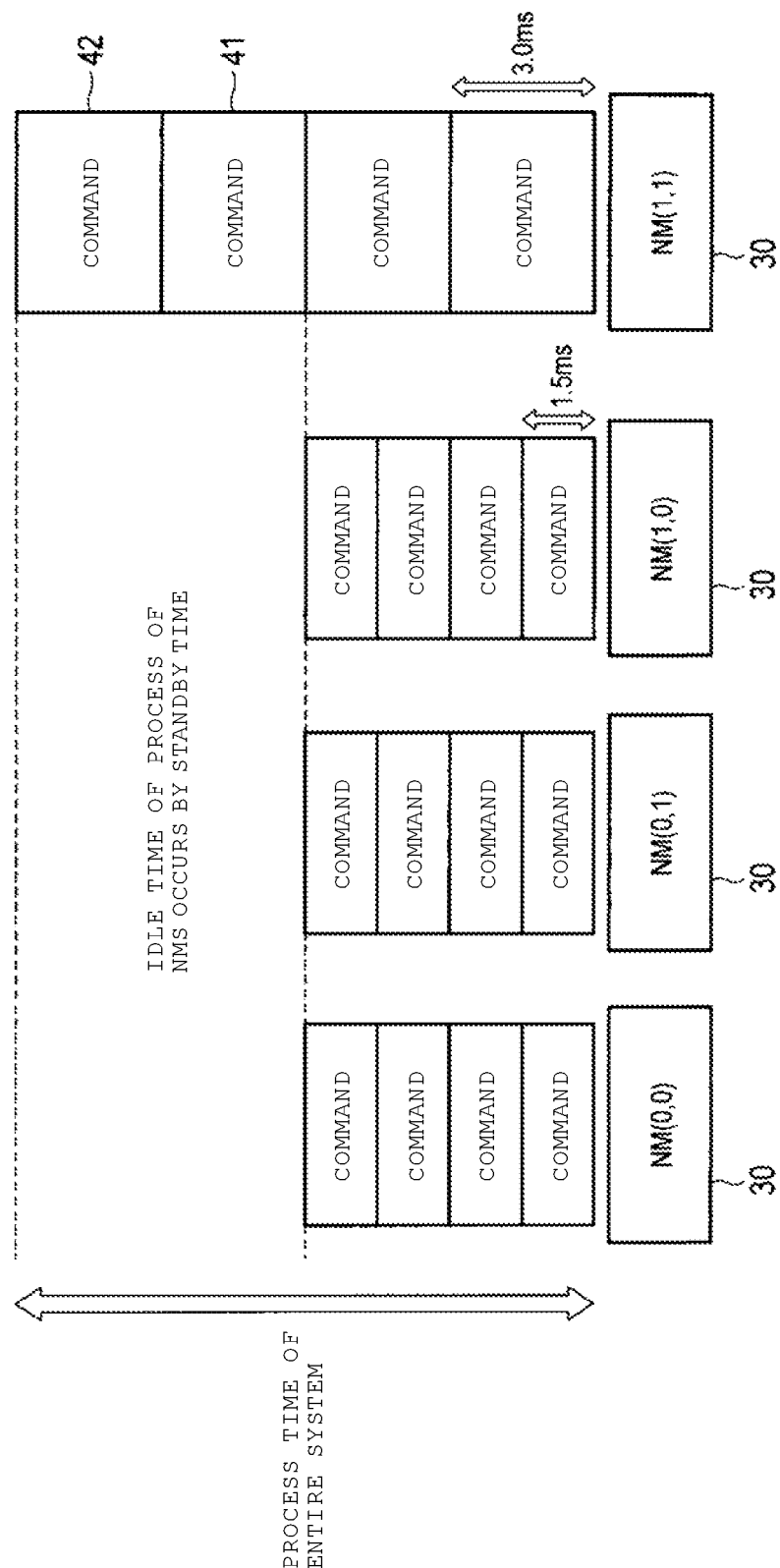
FIG. 4 schematically illustrates delay of command processing by one of the NMs in FIG. 3.

FIG. 4 illustrates an example in which a process of the entire storage system 1 is delayed because the NM (1, 1) of which process is delayed is included in the NM (0, 0), the NM (0, 1), the NM (1, 0), and the NM (1, 1) in the storage system 1. Here, the CU 20 is assumed to issue four commands toward the NM (0, 0), the NM (0, 1), the NM (1, 0), and the NM (1, 1).

In FIG. 4, while the NM (0, 0), the NM (0, 1), and the NM (1, 0) each spend 1.5 milliseconds (ms) to process one command, the NM (1, 1) spends 3.0 milliseconds to process one command. The NM (1, 1) is, for example, an NM in which a process on a command is delayed because garbage collection (GC) is being executed.

Within a period in which the NM (0, 0), the NM (0, 1), and the NM (1, 0) each process four commands, the NM (1, 1)

processes only two commands. In the NM (0, 0), NM (0, 1), and NM (1, 0), an idle time occurs by a standby time in which the NM (1, 1) further processes two commands 41 and 42. Accordingly, the performance of the entire storage system 1 is considerably degraded due to the NM (1, 1) in which the process is delayed.

More specifically, since the NM (1, 1) processes only two commands for 6 milliseconds during which the NM (0, 0), the NM (0, 1), and the NM (1, 0) process four commands, two commands processed by the NM (1, 1) remain in an IO queue of the CU-FW driver 103. That is, commands to be processed by the NM (1, 1) are accumulated two by two in the IO queue for every 6 milliseconds. Therefore, for example, when the number of commands stored in the IO queue is 128, 6 milliseconds by 64 (=128/2) times are delayed. Only the commands to the NM (1, 1) delayed in the IQ queue are stored for approximately 400 milliseconds.

When the IO queue is full of the commands to the NM (1, 1), subsequently-issued commands may not be received until an empty area is generated in the IO queue. That is, in the storage system 1, new input to or output from all of the NM (0, 0), the NM (0, 1), the NM (1, 0), and the NM (1, 1) may not be received. Accordingly, the performance of the entire storage system 1 is considerably degraded due to the NM (1, 1) in which the process is delayed.

Figure 5:
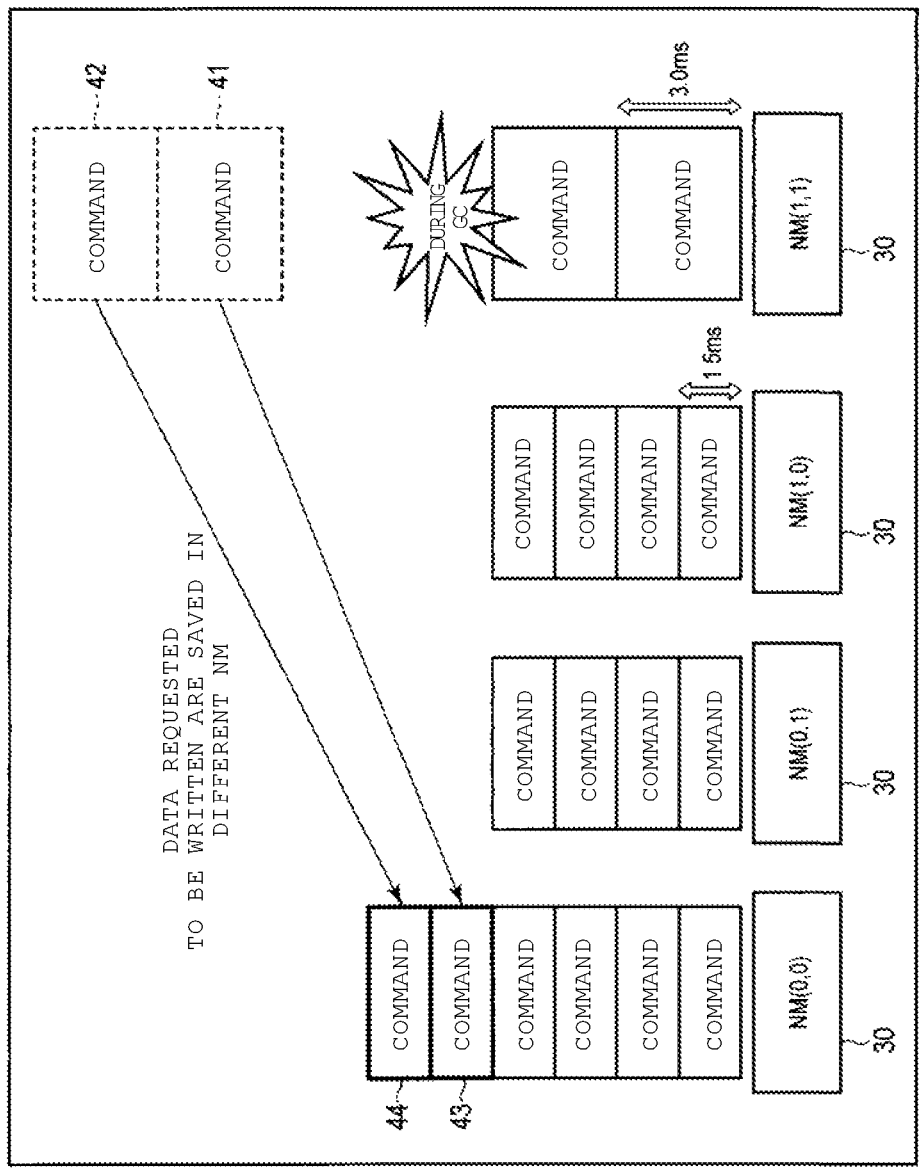
FIG. 5 schematically illustrates reduction of the delay of the command processing by the NM in FIG. 3.

To reduce degradation of the performance, in the present embodiment, data are saved in the different NM when there is a request for writing the data in the NM in which a process is delayed. As illustrated in FIG. 5, instead of issuing write commands 41 to 42 to the NM (1, 1) in which a process is delayed during execution of GC, for example, write commands 43 and 44 are issued to write data requested to be written, in the NM (0, 0) different from the NM (1, 1).

The storage management unit 102 that has the access function and the save function described above includes, for example, an IO segmentation unit 1021, an IO execution unit 1022, a GC detection unit 1023, and a save execution unit 1024. In the following, the storage management unit 102 that receives a request for writing data from the application unit 101 will be exemplified. To facilitate the description, it is assumed that delay of a process does not occur simultaneously in the plurality of NMs 30 in the storage system 1 (for example, the plurality of NMs 30 simultaneously execute garbage collection).

The IO segmentation unit 1021 segments write data received from the application unit 101 into maximum write units for writing data in the NMs 30 and determines the NMs 30 in which the pieces of segmented data are to be written.

Figures 6, 7:
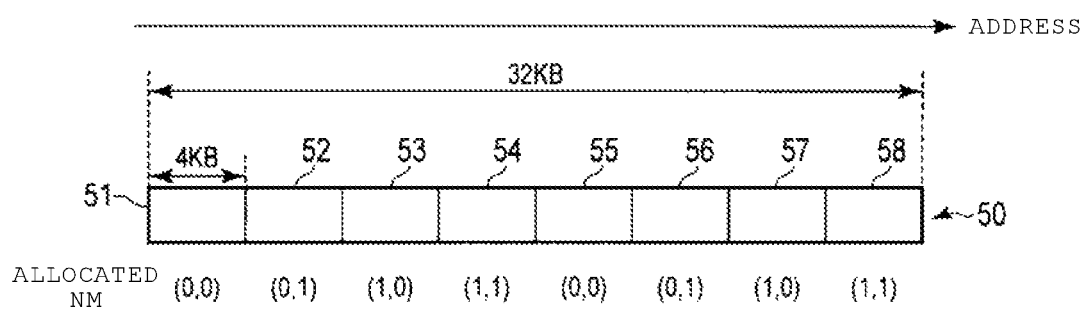
FIG. 6 illustrates segmentation of data into a write unit by the CU in FIG. 3.
FIG. 7 illustrates a configuration of a response history used by the CU in FIG. 3.

FIG. 6 illustrates an example in which write data 50 requested to be written are segmented into the maximum write units and the NMs 30 which are write destinations of the pieces of segmented data 51 to 58 are allocated. The maximum write unit is, for example, 4 KB.

In FIG. 6, the write data 50 with 32 KB is segmented into pieces of segmented data 51 to 58 in units of 4 KB. The pieces of segmented data 51 to 58 are written in one of the NM (0, 0), the NM (0, 1), the NM (1, 0), and the NM (1, 1). As the write destinations of the pieces of segmented data 51 to 58, for example, the NM (0, 0), the NM (0, 1), the NM (1, 0), and the NM (1, 1) are allocated in this order from the head of the pieces of segmented data 51 to 58.

The IO execution unit 1022 determines whether delay of a process by the NM 30 is not detected by the GC detection unit 1023 when an instruction (write command) to write the data segmented by the IO segmentation unit 1021 on the allocated NM 30 is issued. The delay of the process by the NM 30 indicates delay of a command process by the CPU 311 of the NM 30. In the NM 30, a command process is delayed, for example, by executing the GC. The IO execution unit 1022 issues an instruction to write the data on the NM 30 when the delay of the process by the NM 30 is not detected by the GC detection unit 1023.

Conversely, if the delay of the process by the NM 30 is detected by the GC detection unit 1023 when an instruction to write the data segmented by the IO segmentation unit 1021 into the allocated NM 30 is going to be issued, the IO execution unit 1022 and the save execution unit 1024 issue an instruction to write data in a different NM 30. Then, when the delay is detected and a first threshold time elapses, the IO execution unit 1022 and the save execution unit 1024 issue an instruction to copy data in the NAND flash memory 32 of the NM 30 to which the data are originally supposed to be written from the NAND flash memory 32 of the different NM 30 into the two NMs 30. The first threshold time can be set in advance by, for example, a system manager.

After an instruction to write data is issued toward the certain NM 30, the GC detection unit 1023 acquires a write time necessary for this NM 30 to write the data in the NAND flash memory 32. After the instruction is issued, for example, the GC detection unit 1023 acquires, as a write time, a time taken until notification of writing completion is received from the NM 30 via the CU-FW driver 103. The GC detection unit 1023 stores an average value of write periods for each NM 30 as an NM response history 102A.

FIG. 7 illustrates a configuration of the NM response history 102A. The NM response history 102A includes a plurality of entries corresponding to the plurality of NMs 30. Each entry includes, for example, an "NMID" field and an "average write time" field.

In the entry corresponding to each NM 30, the "NMID" field indicates an identifier assigned to the NM 30. The "average write period" field indicates an average of periods of time necessary for the NM 30 to write data. The "average write period" field indicates, for example, an average value of time periods in which the IO execution unit 1022 issues a write command to the NM 30 and is notified of writing completion from the NM 30.

The GC detection unit 1023 may generate the entries included in the NM response history 102A, for example, when an instruction to write data on the corresponding NM 30 is issued for the first time. Then, the GC detection unit 1023 may update the value of the "average write time" field of the corresponding entry using a newly obtained write time whenever an instruction to write data in the NM 30 is issued.

The GC detection unit 1023 detects delay of a process by the certain NM 30 using the NM response history 102A. The GC detection unit 1023 detects delay of a process by the certain NM 30 when a write period of the certain NM 30 is acquired and the acquired write period is greater than a value obtained by adding a second threshold time to an average write period (that is, an average write period obtained from previous data write by the NM 30) of the NM 30 indicated in the NM response history 102A.

Then, the GC detection unit 1023 notifies the IO execution unit 1022 and the save execution unit 1024 of information indicating the NM 30 in which the delay of the process is detected.

The IO execution unit 1022 and the save execution unit 1024 execute a process of saving data to be written in the first NAND flash memory 32 of the NM 30 in which delay of the process is detected, to the second NAND flash memory 32 of the different NM 30 during the first threshold time after being notified. The second NAND flash memory 32 includes a first area for data to be written in the second NAND flash memory and a second area for temporarily saving data to be written in the first NAND flash memory 32. The save execution unit 1024 determines a first address of the first NAND flash memory 32 in which data are to be written and a second address of the second NAND flash memory 32 in which data are to be written for temporary save during the first threshold time, using the size of the second area in the second NAND flash memory 32. The IO execution unit 1022 issues an instruction to write data at the determined second address to the different NM 30. The save execution unit 1024 stores, as saved information 102B, information indicating the first address of the first NAND flash memory 32 in the NM 30 in which data are supposed to be originally written and the second address of the second NAND flash memory 32 in the different NM 30 in which the data are saved.

An example in which write data 65 requested to be written is saved in the different NM 30 from the NM 30 which is the originally writing destination, will be described with reference to FIG. 8. The write data 65 are, for example, segmented data which are segmented by the maximum write unit (for example, 4 KB). Here, it is assumed that the CU 20 and the NM (0, 0), the NM (0, 1), and the NM (1, 1) that each include the NAND flash memory 32 and the CPU 311 executing a data input and output process on the NAND flash memory 32 are included in the storage system 1.

In the NAND flash memory 32-1 of the NM (0, 0), a normal storage area 611 and a storage area 612 for temporary save are prepared. In the NAND flash memory 32-2 of the NM (0, 1), a normal storage area 621 and a storage area 622 for temporary save are prepared. In the NAND flash memory 32-3 of the NM (1, 1), a normal storage area 631 and a storage area 632 for temporary save are prepared.

The storage area 622 for temporary save on the NM (0, 1) is an area to temporary save data to be written in the normal storage area 611 of the NM (0, 0). The storage area 612 of the NM (0, 0) is an area to temporarily save data to be written in the normal storage area 631 of the NM (1, 1).

The format of an address indicating a data storage location includes an ID of the NM and an address for specifying a position of the NAND flash memory managed by the NM. For example, an address "0x010001" indicates an address in which an ID (0, 1) of the NM is indicated by the two high-order digits numbers "01" and a location of the NM on the NAND flash memory is specified by the four low-order digits "0001". In FIG. 8, a range of an address NMANM00 of the normal storage area 611 of the NM (0, 0) is "0x000000" to "0x009FFF" and a range of an address TMP_NMANM11 of the storage area 612 for temporary save is "0x00A000" to "0x00AFFF". A range of an address NMANM01 of the normal storage area 621 of the NM (0, 1) is "0x010000" to "0x019FFF" and a range of an address TMP_NMANM00 of the storage area 622 for temporary save is "0x01A000" to "0x01AFFF". A range of an address NMANM11 of the normal storage area 631 of the NM (1, 1) is "0x110000" to "0x119FFF," and a range of an address TMP_NMANM10 of the storage area 632 for temporary save is "0x11A000" to "0x11AFFF".

Figure 8:
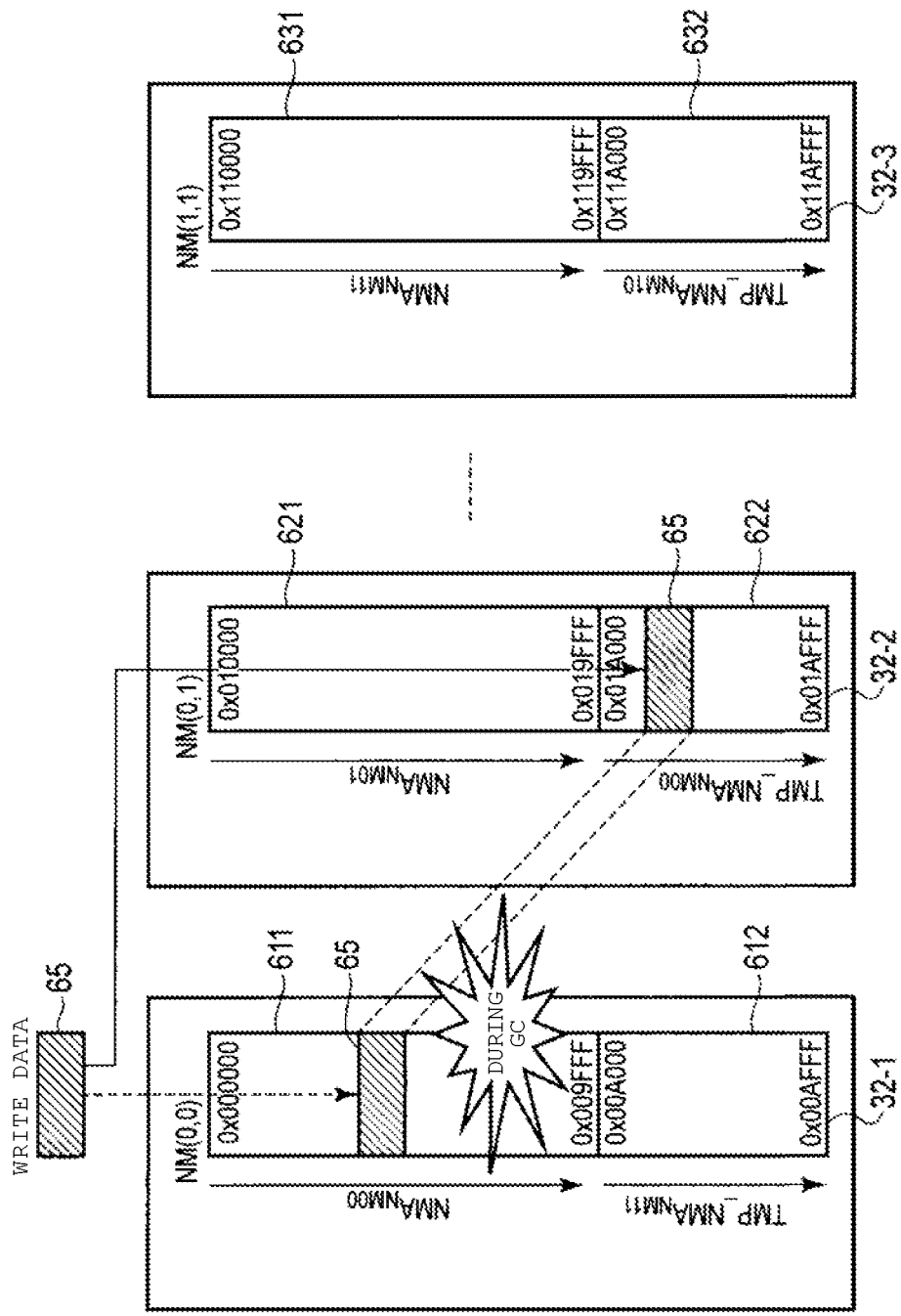
FIG. 8 schematically illustrates save of write data a different NM from the NM in which the process is delayed.

In FIG. 8, it is determined whether the NM (0, 0) is executing the GC when a write command to write the write data 65 in the normal storage area 611 of the NM (0, 0) is going to be issued. When it is determined that the NM (0, 0) is executing the GC, the write data 65 are temporarily written in the storage area 622 of on the different NM (here, the NM (0, 1) having a subsequent ID).

Similarly, it is determined whether the NM (1, 1) is executing the GC when a write command to write the write data in the normal storage area 631 on the NM (1, 1) is going to be issued. Then, when it is determined that the NM (1, 1) is executing the GC, the write data are temporarily written in the storage area 612 of the different NM (here, the NM (0,0)). Since the NM (1, 1) is the NM having the final NMID, the NM (0, 0) having, for example, the head ID is selected as the NM which is a save destination.

When the write data 65 requested to be written are saved in the different NM (0, 1) from the NM (0, 0) which is an original written destination, the address TMP_NMANM00 of the save destination is calculated using the address NMANM00 indicating the original written destination and a size MAX_TMP_NMA_NUM (that is, the number of areas in which data of the maximum write unit can be written) of the storage area 622 of the save destination. In the following, a method of calculating a value of four low-order digits for specifying a position of the NM in the format of the above-described address will be described.

The address TMP_NMANM00 of the save destination is calculated using a remainder R (=NMANM00% MAX_TMP_NMA_NUM) obtained by dividing the address NMANM00 of the original written address by the size MAX_TMP_NMA_NUM of the storage area for temporary save. For example, the address of an R-th area in the storage area for temporary save is calculated as the address TMP-_NMANM00 of the save destination. When the data of the calculated address of the save destination are already written, the data may be written in an empty area which is found by searching for a subsequent address in order.

More specifically, for example, it is assumed that storage areas corresponding to 100 pieces of data in the maximum write unit are included in each NM, head 90 pieces of the data are set in normal storage areas, and subsequent 10 pieces of the data are set in storage areas for temporary save. The addresses of the 100 storage areas are "0x0000" to "0x0063" (99 in decimal numbers) in order from the head. Accordingly, a range of addresses of normal storage areas is "0x0000" to "0x0059," and a range of addresses of storage areas for temporary save is "0x005A" to "0x0063".

In such a case, for data to be written at an address "0x003C" in the normal storage areas of a certain NM, a remainder is 0 when "0x003C" (60 in a decimal number) is divided by 10. Therefore, the data are written at an address "0x005A" of a 0-th area in the storage areas for temporary save of a different NM. Similarly, for data to be written at an address "0x003D" in the normal storage area of a certain NM, a remainder is 1 when "0x003D" (61 in a decimal number) is divided by 10. Therefore, the data are written at an address "0x005B" of a first area in the storage areas for temporary save of a different NM.

In the above-described example, an NM having an NMID subsequent to the NMID of the NM 30 on which data are supposed to be originally written is selected as an NM in which data are saved (here, the NM having the head NMID is selected in regard to the NM having the final NMID). However, the method of selecting the NM in which data are saved is not limited thereto.

The save execution unit 1024 may set up an order of the NMs based on the value of the "average write time" field of the NM response history 102A and selects a different NM for which the average write time is shortest as the NM in which data are saved. For example, it is assumed that delay of a process by the NM (0, 0) is detected when an instruction to write the write data 65 on the NM (0, 0) is issued. The save execution unit 1024 selects the NM (1, 1) as a data save destination when an average write time at the time of previously writing data on the NM (1, 1) is shorter than an average write time at the time of previously writing data on the NM (0, 1). The IO execution unit 1022 issues an instruction to write the write data 65 on the NM (1, 1) in order to temporarily save the write data 65 in the NAND flash memory 32-3 of the NM (1, 1). When delay of a process by the NM (0, 0) is detected and the first threshold time elapses, the IO execution unit 1022 issues an instruction to copy the write data 65 to the NAND flash memory 32-1 of the NM (0, 0) from the NAND flash memory 32-3 of the NM (1, 1) to the NM (0, 0) and the NM (1, 1). As described above, it is possible to save the data in the NM in which a process is faster.

FIG. 9 illustrates a configuration of the saved information 102B stored by the save execution unit 1024. The saved information 102B includes at least one entry corresponding to at least one saved data. Each entry includes, for example, an "entry ID" field, a "source address" field, a "save destination address" field, and a "copy-completion flag" field.

In the entry corresponding to the saved data, the "entry ID" field indicates identification information assigned to the entry. In the "entry ID" field, identification information assigned in a consecutive number is set, for example, whenever a data save process is executed. The "source address" field indicates the address of an NM to which corresponding data are supposed to be originally written. That is, the "source address" field indicates the address of a source NM in which the saved data are to be written. The "save destination address" filed indicates the address of an NM in which the corresponding data are saved. The addresses indicated in the "source address" field and the "save destination address" field include the ID of the NM and an address for specifying a position on the NAND flash memory 32 managed by the NM, as described above.

The "copy-completion flag" field indicates a flag that represents whether corresponding data are copied to the NM to which the data are supposed to be originally written. In the "copy-completion flag" field, for example, either of "False" indicating that the corresponding data are not yet copied and "True" indicating that the corresponding data are already copied is set.

The save execution unit 1024 requests the IO execution unit 1022 to copy the data in the NM 30 in which the data are supposed to be originally written from the NM 30 in which the data is saved, using the saved information 102B when the delay of a process by the certain NM 30 is detected and the first threshold time elapses. In response to the request, the IO execution unit 1022 issues an instruction to copy the data to the first NAND flash memory 32 of the NM 30 in which the data are supposed to be originally written from the second NAND flash memory 32 of the NM 30 in which the data are saved.

More specifically, for example, when delay of a process by the certain NM 30 is detected and the first threshold time elapses, the save execution unit 1024 extracts, from the saved information 102B, the entry in which the NMID indicated in the "source address" field corresponds to the NM 30 and the value of the "copy-completion flag" is "False". Then, the save execution unit 1024 reads data from the address of the NM 30 indicated in the "save destination address" of each of the extracted entries and requests the IO execution unit 1022 to write the read data at the address on the different NM 30 indicated in the "source address" field.

In response to the request, the IO execution unit 1022 issues an instruction (read command) to read data from the address indicated in the "save destination address" field to the NM 30 specified by the NMID indicated in the "save destination address" field. Then, the IO execution unit 1022 issues an instruction (write command) to write the read data at an address indicated in the "source address" field to a different NM 30 specified by the NMID indicated in the "source address" field.

Figure 10:
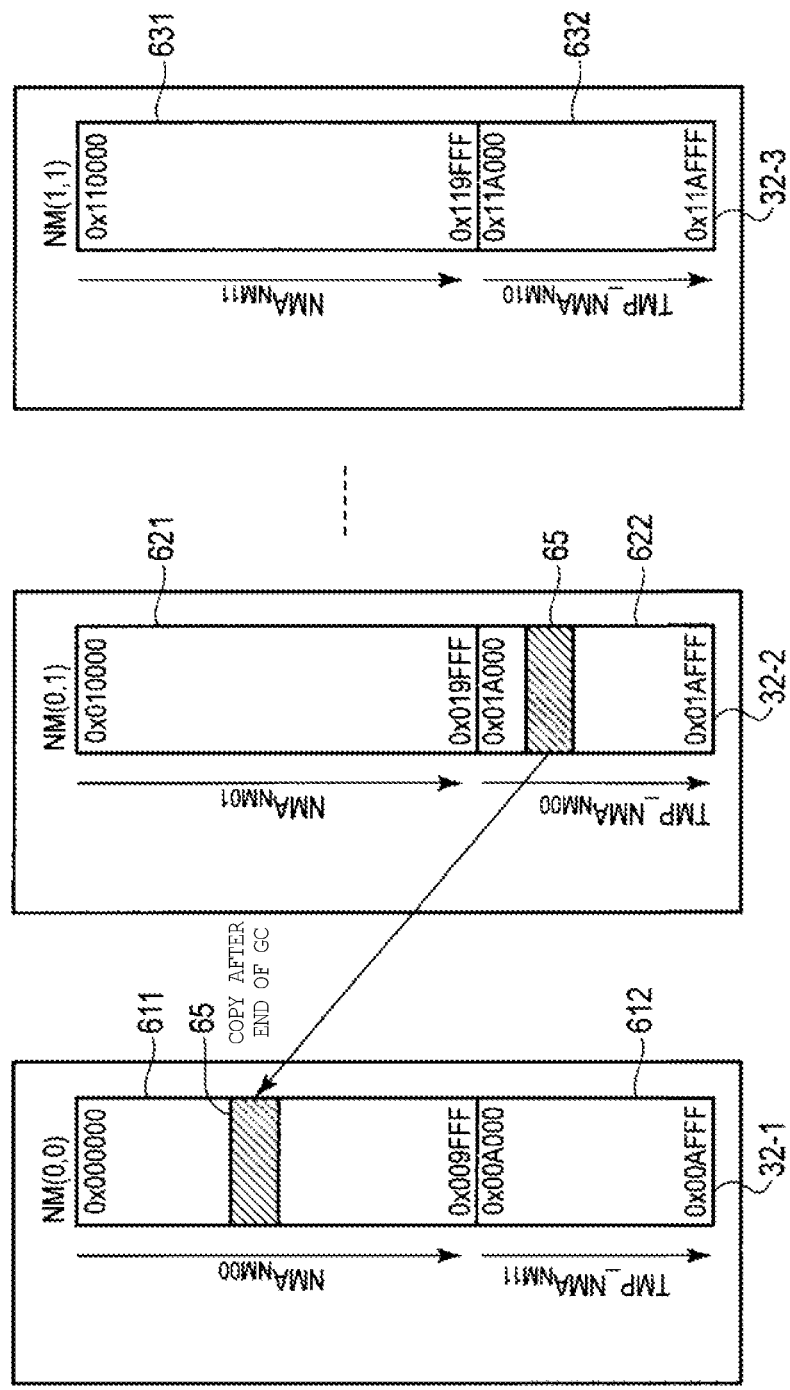
FIG. 10 schematically illustrates an example in which saved write data are copied to the NM to which the write data are originally supposed to be written by the CU in FIG. 3.

As illustrated in FIG. 10, the write data 65 written in the storage area 622 of the NM (0, 1) are copied to the normal storage area 611 on the NM (0, 0) to which the data are supposed to be originally written, for example, after the execution of the GC on the NM (0, 0) ends (that is, the first threshold time elapses).

According to such an operation, when the data are written from the NM 30 which is the save destination into the NM 30 to which the data are supposed to be originally written, the save execution unit 1024 may change the value of the "copy-completion flag" field of the entry corresponding to the saved information 102B to "True".

In the foregoing configuration, when delay of a process by the certain NM 30 is detected, the data to be written in the NM 30 is saved in a different NM 30, and when the delay of the process is resolved, and the data are subsequently copied to the source NM 30. Therefore, it is possible to reduce the considerable degradation of the performance of the entire storage system 1 caused due to the delay of the process by one NM 30.

Figure 11:
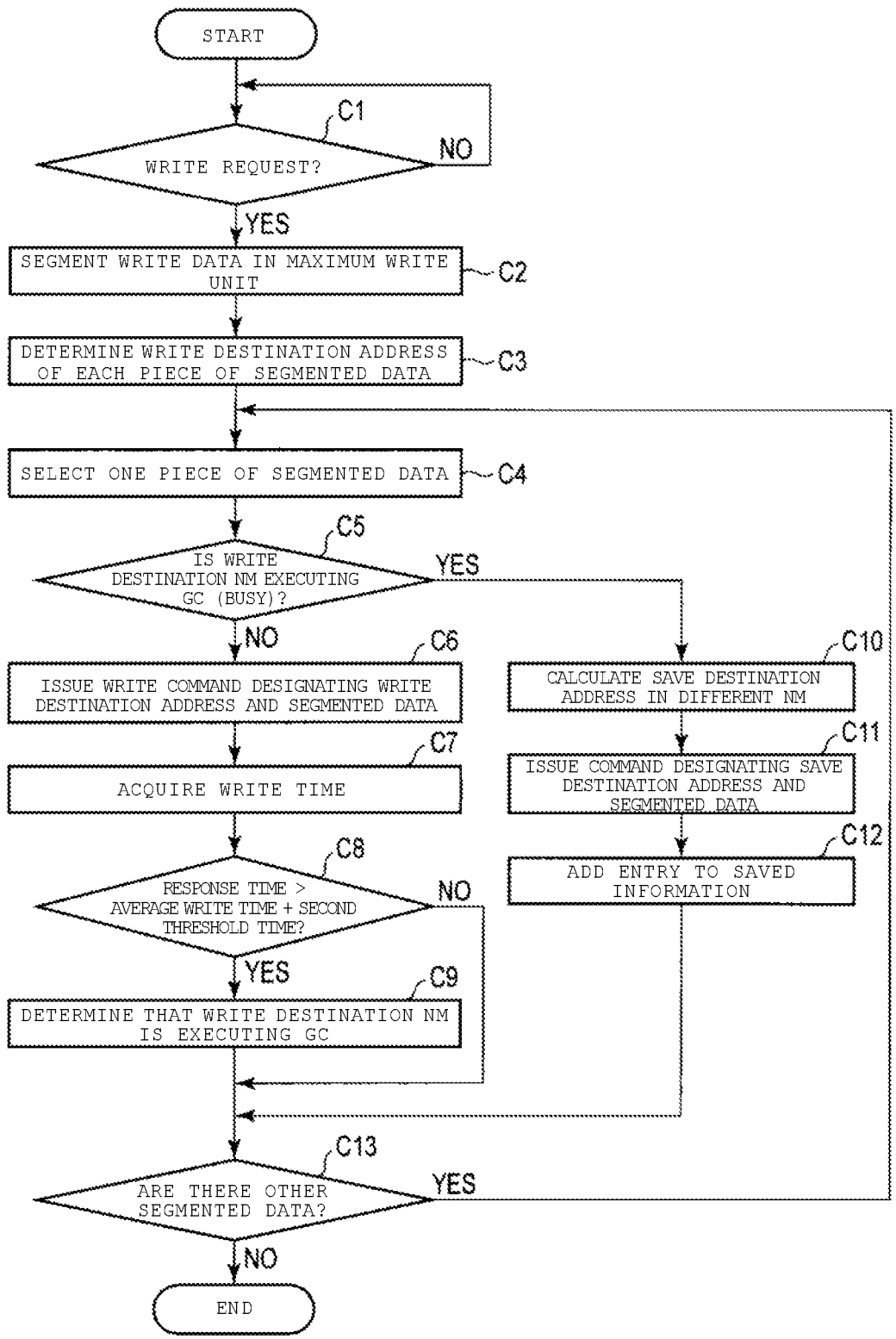
FIG. 11 is a flowchart illustrating a procedure of a writing process executed by the CU in FIG. 3.

Next, a procedure of a write process executed by the CPU 21 of the CU 20 will be described with reference to the flowchart of FIG. 11.

First, the CPU 21 determines whether there is a data write request (step C1). The write request is, for example, a write request from the client device 2. When there is no write request (NO in step C1), the process returns to step C1 to determine whether there is a write request again.

When there is a write request (YES in step C1), the CPU 21 segments write data corresponding to the write request into a plurality of the maximum write units (step C2). That is, a plurality of pieces of segmented data is obtained by segmenting the write data. The CPU 21 determines a write destination address of a write destination of each piece of the segmented data (step C3). The write destination address includes, for example, an ID of the NM 30 and an address indicating a write destination in the NM 30, as described above.

Subsequently, the CPU 21 selects one piece of the segmented data among the plurality of pieces of the segment data (step C4). The CPU 21 determines whether the NM 30 which is the write destination is the NM which is executing the GC, using the write destination address of the selected segmented data (step C5). More specifically, for example, the CPU 21 determines whether the delay of the process by the NM 30 which is the write destination is detected.

Conversely, when the NM 30 which is the write destination, is not the NM executing the GC (NO in step C5), the CPU 21 issues a write command designated by the write destination address and the segmented data toward the NM 30 (step C6). In response to the write command, the NM 30 which is the write destination writes the segmented data in the designated address and notifies the CU 20 that the writing is completed.

The CPU 21 acquires a write period of the NM 30 which is the write destination (step C7). For example, the CPU 21 acquires, as the write period, a period of time from the time the write command is issued to the time a notification indicating completion of the writing is received from the NM 30. Then, the CPU 21 determines whether the acquired write period is greater than a value obtained by adding the second threshold time (for example, 1 millisecond) to the average write period of the NM 30 which is the write destination (step C8). The average write period is calculated based on a previous response history of each NM 30 and is stored as, for example, an NM response history 102A in the CU 20. When the write period is equal to or less than the value obtained by adding the second threshold time to the average write period of the NM 30 which is the write destination (NO in step C8), step C9 is skipped. That is, the CPU 21 determines that the NM 30 which is the write destination is not executing the GC.

When the write period is greater than the value obtained by adding the second threshold time to the average write period of the NM 30 which is the write destination (YES in step C8), the CPU 21 determines that the NM 30 which is the write destination is executing the GC (step C9). When it is determined that the NM 30 which is the write destination is executing the GC, the CPU 21 estimates that the NM 30 which is the write destination is executing the GC for only the first threshold time set in advance from the detection timing and determines that the write destination is the NM which is executing the GC in the procedure of the above-described step C5.

When the CPU 21 determines that the write destination is the NM which is executing the GC in step C5 (YES in step C5), the CPU 21 calculates a save destination address of a different NM from the NM 30 which is the write destination (that is, the NM which is the save destination) 30 in order to save the segmented data in the different NM 30 (step C10). The save destination address includes the ID assigned to the NM 30 which is the save destination and the address indicating the write destination in the NM 30 of the save destination. The CPU 21 issues the write command designated by the save destination address and the segmented data toward the different NM 30 (step C11). In response to the write command, the NM 30 of the save destination writes the segmented data at the designated address and notifies the CU 20 that the writing is completed. The CPU 21 adds an entry indicating that the segmented data is saved in the saved information 102B, in the CU 20 (step C12). The entry includes, for example, the write destination address (that is, the source address before the save) and the save destination address.

Subsequently, the CPU 21 determines whether or not there is other unwritten segmented data (step C13). When there is other unwritten segmented data (YES in step C13), the process returns to step C4 and the procedure for writing the segmented data is executed. When there is no other unwritten segmented data (NO in step C13), that is, all of the segmented data are completely written, the process ends.

Figure 12:
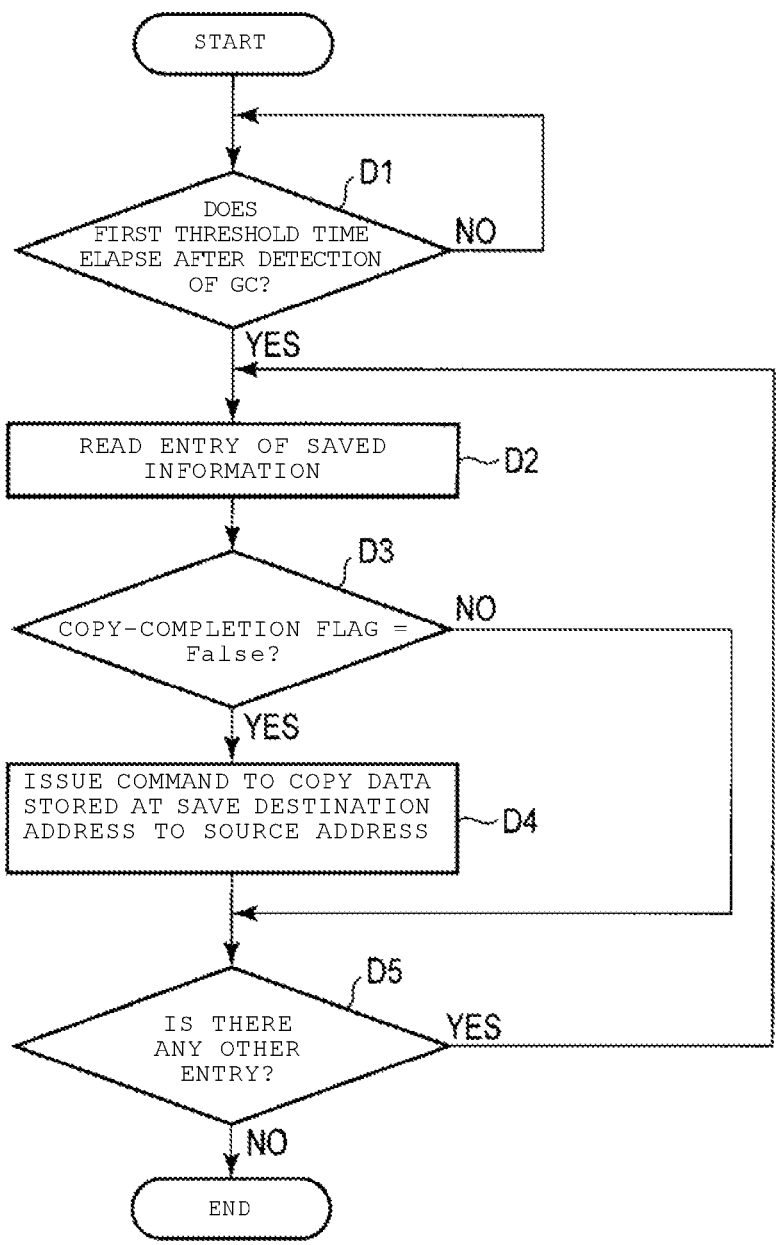
FIG. 12 is a flowchart illustrating a procedure of a copy process executed by the CU in FIG. 3.

The flowchart of FIG. 12 illustrates an example of the procedure of the copy process executed by the CPU 21 of the CU 20. The copy process is executed to copy the saved data through the above-described write process into the NM 30 which is the original write destination from the NM 30 which is the save destination.

First, the CPU 21 determines whether the first threshold time elapses after it is determined that the certain NM 30 is executing the GC (step D1). More specifically, for example, the CPU 21 determines whether the first threshold time elapses after it is determined that the NM 30 which is the write destination is executing the GC in step C9 of the flowchart of FIG. 11 described above. When the first threshold time does not elapse after it is determined that the certain NM 30 is executing the GC (NO in step D1), it is estimated that the NM 30 is still executing the GC. Therefore, the process returns to step D1.

When the first threshold time elapses after it is detected that the certain NM 30 is executing the GC (YES in step D1), the CPU 21 reads the entry related to the NM 30 from the saved information 102B (step D2). Then, the CPU 21 determines whether "False" is set in the "copy-completion flag" field of the read entry (step D3). When "False" is set in the "copy-completion flag" field (YES in step D3), the CPU 21 issues a command to copy the data written at the save destination address indicated in the "save destination address" field of the entry to the original write destination address indicated in the "source address" field (step D4). The CPU 21 issues, for example, a read command to read data stored at the save destination address and subsequently issues a write command to write the data read in response to the read command into the original write destination address. When the data are written at the original write destination address, the CPU 21 sets "True" in the "copy-completion flag" field of the entry.

When "False" is not set in the "copy-completion flag" field (NO in step D3), for example, when "True" is set in "copy-completion flag" field, the procedure of step D4 is skipped.

Subsequently, the CPU 21 determines whether there is another entry related to the NM 30 for which the threshold time elapses after it is detected that the GC is being executed in the saved information 102B (step D5). When there is another entry (YES in step D5), the process returns to step D2 and a process based on the new entry is executed. When there is no other entry (NO in step D5), the process ends.

As described above, according to the present embodiment, it is possible to reduce the considerable degradation of the performance of the entire storage system 1 caused due to the delay of the process of one NM 30. The CPU 311 of the NM (0, 0) executes an input and output process on the first NAND flash memory 32 based on an input and output instruction issued by the CPU 21 of the CU 20. The CPU 311 of the NM (0, 1) executes an input and output process on the second NAND flash memory 32 based on an input and output instruction issued by the CPU 21 of the CU 20. When an instruction to write the first data is issued to the NM (0, 0) and delay of a process by the CPU 311 of the NM (0, 0) is detected, the CPU 21 of the CU 20 issues an instruction to write the first data on the NM (0, 1) in order to temporarily save the first data in the second NAND flash memory 32. When the delay is detected and the first threshold time elapses, the CPU 21 issues an instruction to copy the first data to the first NAND flash memory 32 from the second NAND flash memory 32, toward the NM (0, 0) and the NM (0, 1). Thus, it is possible to reduce the considerable degradation of the entire storage system 1 caused due to the delay of the process of the NM (0, 0).

Second Embodiment

Next, a second embodiment will be described. The same reference numerals are used for the same elements as those of the first embodiment and the redundant description will be omitted.

In the first embodiment described above, the commands, which are to be issued to the NM 30 in which the NAND flash memory 32 is executing the garbage collection (GC) process, stays in the CU 20. In contrast, in the second embodiment, countermeasures are carried out for a situation the fact that a command which is issued by the CU 20 to the NM 30 in which the NAND flash memory 32 is executing the garbage collection process stays in the NM 30. More specifically, the CU 20 and the NM 30 cooperate such that the CU 20 refrains from issuing of a command to the NM 30 in which the NAND flash memory 32 is executing the garbage collection process.

Figure 13:
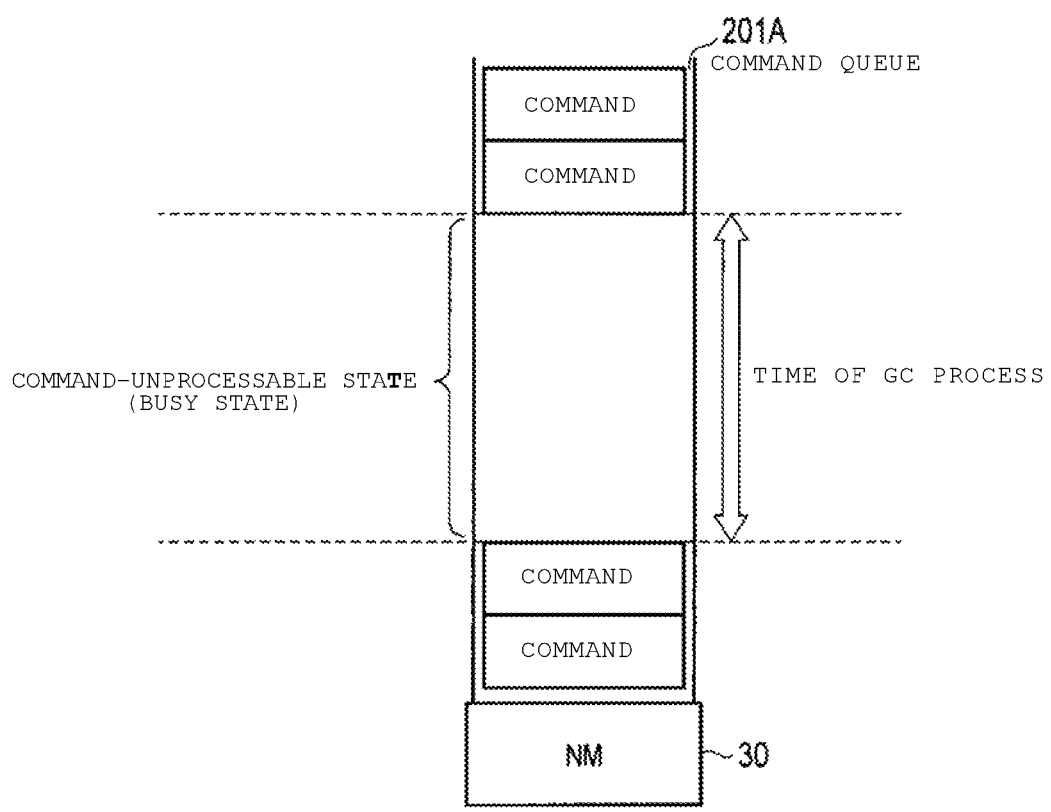
FIG. 13 schematically illustrates influence of a garbage collection process by a NAND flash memory on the NM.

FIG. 13 illustrates influence of a garbage collection process by the NAND flash memory 32 on the NM 30.

The NM-FW driver 201 of the NM 30 generates a command queue 201A in the RAM 312 as an area to temporarily and chronologically accumulate an input and output instruction from the CU 20. The NM-FW driver 201 sequentially extracts commands from the command queue 201A and issues the commands to the NAND flash memory 32.

In the present embodiment, when the NAND flash memory 32 starts the garbage collection process, the NM 30 is assumed to be in a state in which no command is processable until the garbage collection process ends, that is, while the garbage collection process is being executed by the NAND flash memory 32, as illustrated in FIG. 13. In other words, the garbage collection process by the NAND flash memory 32 is assumed to lock the NM 30.

In general, the CU 20, more specifically, the CU-FW driver 103, can detect that the NM 30 is in a command-unprocessable state (busy state) since the NAND flash memory 32 is executing the garbage collection process, based on the fact that the response to the command issued to the NM 30, that is, the process result, is not obtained during a restriction time (time-out). When it is detected that the NM 30 is in the command-unprocessable state, the CU-FW driver 103 can suppress issuing of the command to the NM 30. For example, any of the measures described in the first embodiment can be taken on the command to be issued to the NM 30.

When the restriction time is long, that is, a necessary time until the CU 20 detects that the NM 30 is in the command-unprocessable state is long, a command would be issued to the NM 30 by the CU 20 meanwhile and stays in the NM 30. Therefore, the performance of the entire storage system 1 may be considerably affected.

However, when the restriction time is shortened, there is a concern of time-out occurring because of a factor other than the garbage collection process by the NAND flash memory 32, and therefore the restriction time cannot be easily shortened. For example, as described above, since a command and a transmission route of a process result between the CU 20 and the NM 30 are dynamically determined. When the restriction time treated as the time-out is shortened, there is a concern of time-out occurring due to the transmission route.

Figure 14:
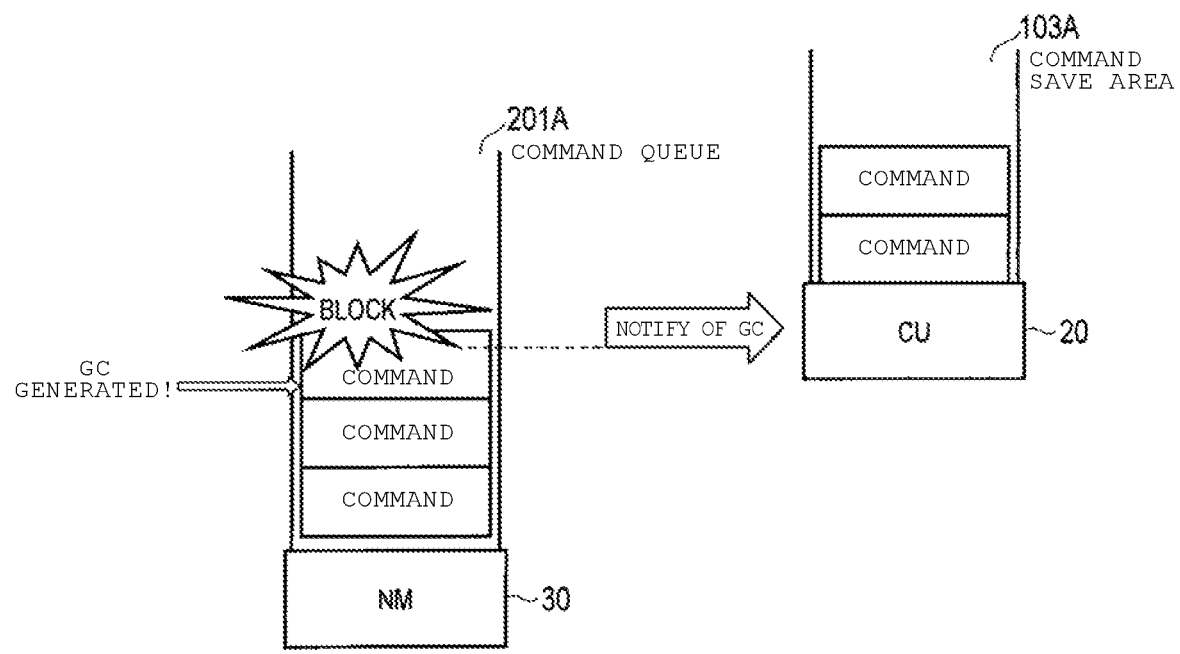
FIG. 14 illustrates an overview of an operation when a NAND flash memory of a storage system according to a second embodiment executes a garbage collection process.

Accordingly, in the storage system 1 according to the present embodiment, the NM-FW driver 201 detects that the NAND flash memory 32 is executing the garbage collection process in a considerably short time, compared to the restriction time set in general, as described above, (in order to detect that the NM 30 is in the command-unprocessable state since the NAND flash memory 32 is executing the garbage collection process) in the CU-FW driver 103 and notifies the CU 20 that the NAND flash memory 32 is executing the garbage collection process. FIG. 14 illustrates an overview of an operation of the storage system 1 according to the present embodiment when the NAND flash memory 32 carries out a garbage collection process.

When a response to a command issued to the NAND flash memory 32 is not obtainable during the restriction time, that is, time-out occurs, the NM-FW driver 201 determines that the NAND flash memory 32 is executing the garbage collection process and notifies the CU 20, which is an issuing source of the command, that the NM 30 is in the command-unprocessable state. As a time period during which the NM-FW driver 201 waits for a response (process result) to a command, a considerably short time is set, compared to the restriction time set in the CU-FW driver 103, as described above, (in order to detect that the NM 30 is in the command-unprocessable state since the NAND flash memory 32 is executing the garbage collection process). A method of determining the time period during which the NM-FW driver 201 waits for a response (process result) to a command will be described below.

Thus, as illustrated in FIG. 14, it is possible to at least prevent a command from being issued to the NM 30 by the CU 20 which is an issuing source of the command for which the time-out is detected by the NM-FW driver 201. The CU-FW driver 103 according to the present embodiment generates the command save area 103A used to save a command on the RAM 22 in order to prevent the command to the NM 30 from being issued while the NAND flash memory 32 is executing the garbage collection process. In the present embodiment, when the command to be issued is a command to the NM 30 which is a notification source, the CU 20 receiving this notification is assumed to save the command in the command save area 103A. Needless to say, when the CU 20 receives this notification, the CU 20 may process a command to the NM 30 which is the notification source, for example, as described in the first embodiment. This notification may be executed for all of the CUs 20. The CUs 20 may communicate with each other and the CU 20 receiving this notification may transmit this notification to the other CUs 20.

The notification from the NM-FW driver 201 to the CU-FW driver 103 can be executed with, for example, the above-described interruption request signal. That is, this notification is assumed to be distinguished from a response (process result) to error end of the command. The fact that the CU 20 can detect that the NM 30 is in the command-unprocessable state in a short time contributes to an improvement in the performance of the entire storage system 1 since the command to the NM 30 can be prevented from being issued or any countermeasure for the command to be issued to the NM 30 can be taken quickly.

For example, when the CU 20 can execute a predetermined number of issuing commands to the NMs 30 in parallel, degradation of the performance of the entire storage system 1 can be suppressed by saving commands in the NM 30 in the command-unprocessable state and issuing commands to the NMs in the command-processable state more within a predetermined number. When the CU 20 processes the command to the NM 30 in the command-unprocessable state, for example, as described in the first embodiment, this process can be started quickly, and thus degradation of the performance of the entire storage system 1 can be suppressed.

Figure 15:
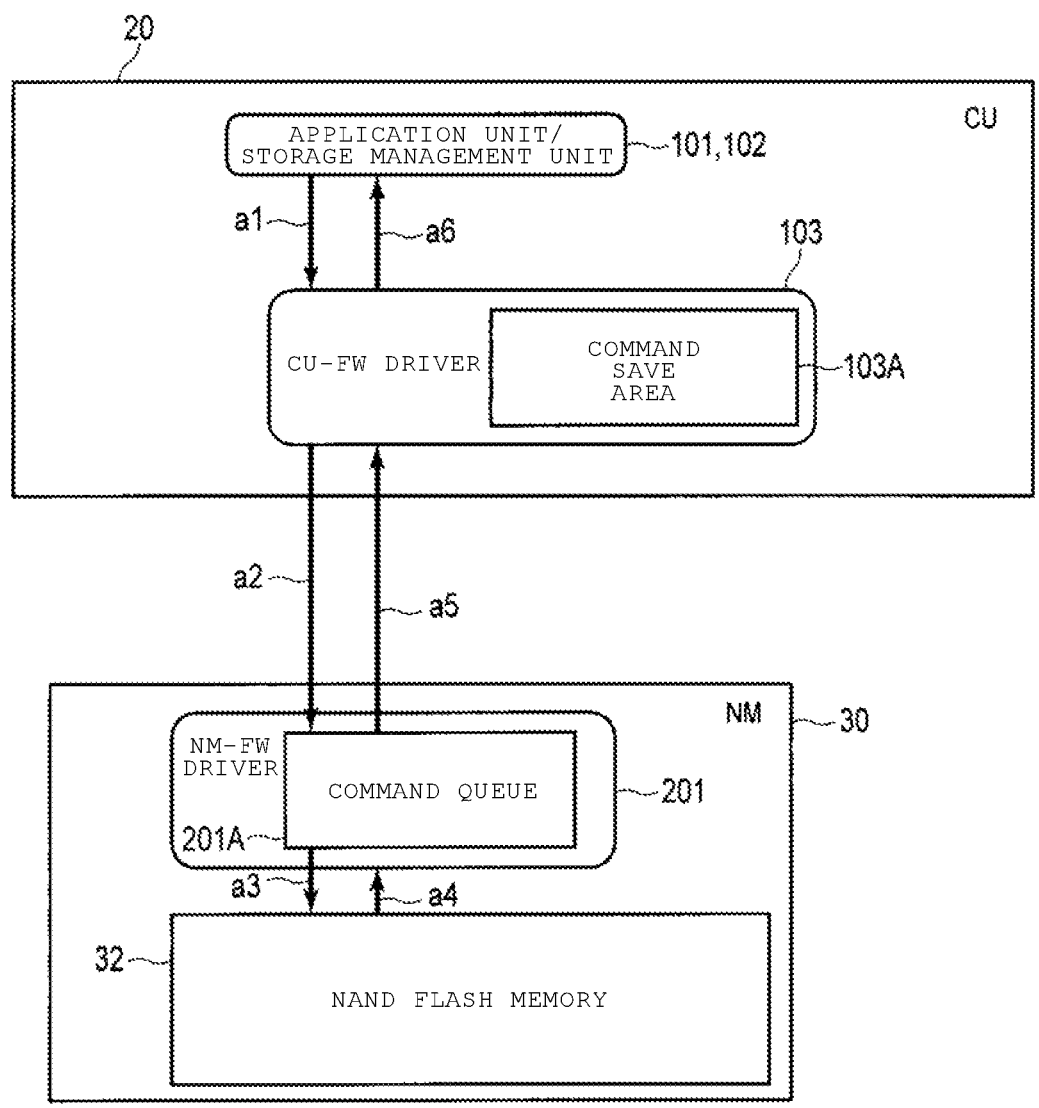
FIG. 15 illustrates a communication procedure between a CU and an NM when the CU issues a command to the NM in a command-processable state in the storage system according to the second embodiment.

First, a communication procedure between the CU 20 and the NM 30 when the NAND flash memory 32 is not executing the garbage collection process and the CU 20 issues a command to the NM 30 in the command-processable state will be described with reference to FIG. 15. FIG. 15 illustrates the application unit 101 and the storage management unit 102 which are integrated in the CU 20.

When a request from the client device 2 is received by the network switch 10, the CU 20 issues a command directed to the NM 30 corresponding to the request to the CU-FW driver 103 via the application unit 101 and the storage management unit 102 (a1). The CU-FW driver 103 issues this command to the designated NM 30 (a2). This command is input to the command queue 201A of the NM-FW driver 201 in the NM 30 which is an issue destination. As described above, here, it is assumed that the NAND flash memory 32 of the NM 30 is not executing the garbage collection process.

In the NM 30, the NM-FW driver 201 issues a command extracted from the command queue 201A to the NAND flash memory 32 (a3) and receives the process result from the NAND flash memory 32 (a4). The NM-FW driver 201 transmits the process result received from the NAND flash memory 32 to the CU 20 which is an issuing source of the command (a5). The process result is received by the CU-FW driver 103 of the CU 20, and then the CU-FW driver 103 transmits the process result received from the NM 30 to the storage management unit 102 (a6).

Figure 16:
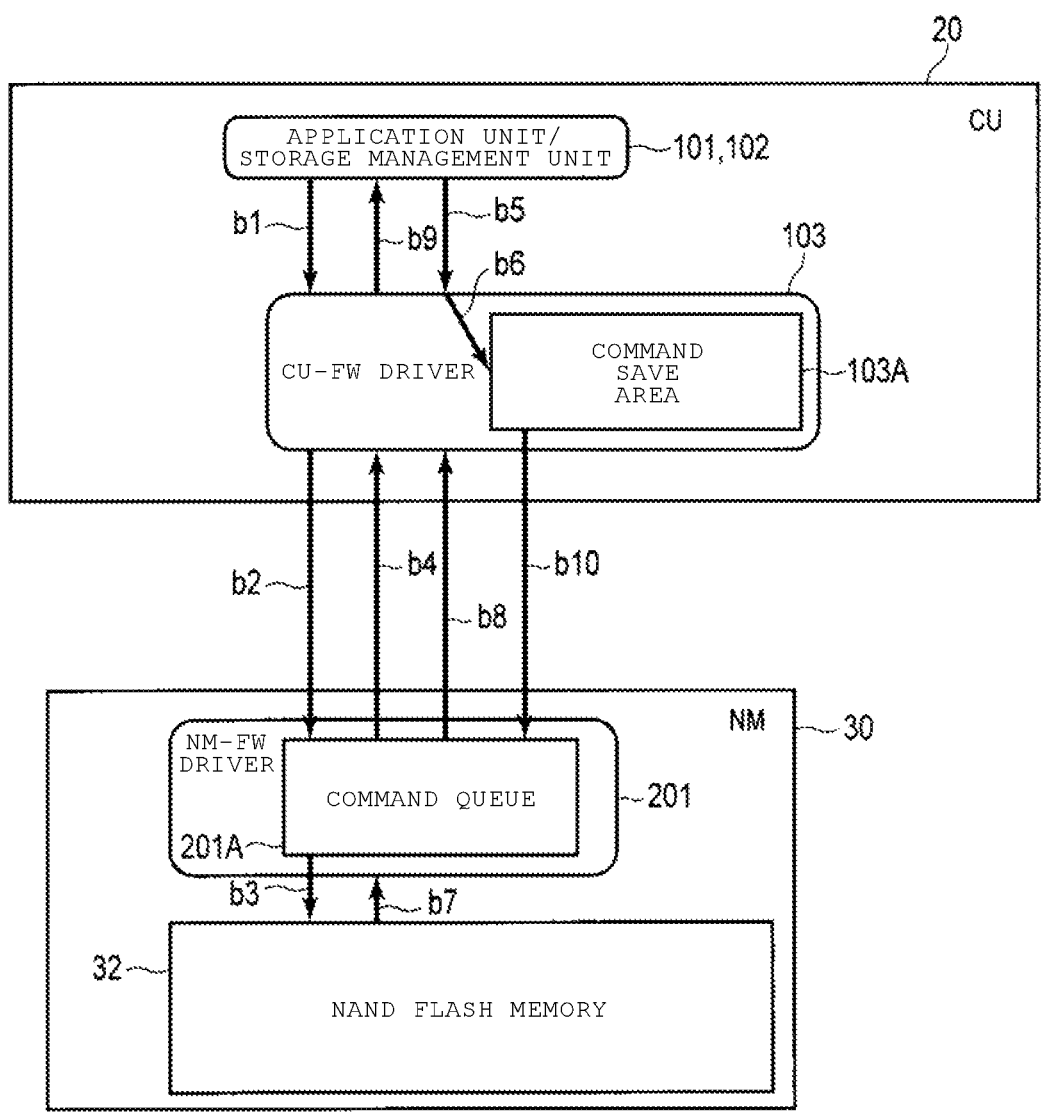
FIG. 16 illustrates a communication procedure between a CU and an NM when the CU issues a command to the NM in a command-unprocessable state in storage system according to the second embodiment.

Next, a communication procedure between the CU 20 and the NM 30 when the NAND flash memory 32 is executing the garbage collection process and the CU 20 issues a command to the NM 30 in the command-unprocessable state will be described with reference to FIG. 16. FIG. 16 also illustrates the application unit 101 and the storage management unit 102 which are integrated in the CU 20.

As described above, the CU 20 issues a command directed to the NM 30 corresponding to a request from the client device 2 to the CU-FW driver 103 via the application unit 101 and the storage management unit 102 (b1). The CU-FW driver 103 issues the command to the designated NM 30 (b2). This command is input to the command queue 201A of the NM-FW driver 201 in the NM 30 which is an issue destination. Here, it is assumed that the NAND flash memory 32 of the NM 30 is executing the garbage collection process.

The NM-FW driver 201 of the NM 30 extracts a command from the command queue 201A and issues the command to the NAND flash memory 32 (b3). However, since the NAND flash memory 32 is executing the garbage collection process, the NM-FW driver 201 may not obtain a process result of the command from the NAND flash memory 32 within the restriction time. At this time, the NM-FW driver 201 determines that the NAND flash memory 32 is executing the garbage collection process and notifies the CU 20 which is an issuing source of the command, that the NM 30 is in the command-unprocessable state (b4). As described above, this notification can be executed with the interruption request signal.

This notification is received by the CU-FW driver 103 in the CU 20. When the command directed to the NM 30 which is the notification source is received from the storage management unit 102 (b5) after the reception of the notification, the CU-FW driver 103 saves the command to the command save area 103A (b6). For other commands directed to the NM 30, the CU-FW driver 103 normally issues the commands to the NM 30.

When the NAND flash memory 32 ends the garbage collection process, a command in which time-out is detected by the NM-FW driver 201 is processed and a process result is transmitted to the NM-FW driver 201 (b7). The NM-FW driver 201 receiving this process result from the NAND flash memory 32 determines that the NAND flash memory 32 ends the garbage collection process. The NM-FW driver 201 notifies the CU 20 which is the issuing source of the command that the NM 30 recovers to the command-processable state (the command-unprocessable state is resolved), and transmits a process result of the command (b8). This notification can also be executed with the interruption request signal.

The notification and the process result of the command are received by the CU-FW driver 103 of the CU 20. The CU-FW driver 103 transmits the process result of the command received from the NM 30 to the storage management unit 102 (b9). The CU-FW driver 103 receiving this notification issues a command directed to the NM 30 and saved in the command save area 103A (b10).

Hereinafter, a method of determining a waiting time of a response (process result) to a command issued to the NAND flash memory 32 and set in the NM-FW driver 201, that is, the restriction time treated as time-out, in order to detect that the NAND flash memory 32 is executing the garbage collection process will be described.

In the storage system 1 according to the present embodiment, a response time under the situation in which there is no influence of the garbage collection process by the NAND flash memory 32, more specifically, a time period during which the NM-FW driver 201 issues a command to the NAND flash memory 32 and then the NM-FW driver 201 acquires a response (process result) to the command from the NAND flash memory 32, is measured for each kind of commands, and an average value (average time) and a standard deviation are calculated. Here, it is assumed that m is the average time and σ is the standard deviation.

In the storage system 1 according to the present embodiment, m+3σ is set as a time period during which the NM-FW driver 201 waits for a response (process result) to a command, that is, the restriction time. The reason why m+3σ is set is that abnormality can be detected at a probability of 99.7% on the assumption of a normal distribution. A time such as m+3σ is a considerably short time, compared with the restriction time set in general in the CU-FW driver 103, as described above, (in order to detect that the NM 30 is in the command-unprocessable state since the NAND flash memory 32 is executing the garbage collection process).

Now, it is assumed that a transmission time of a command from the CU 20 to the NM 30 is 0.5 ms, the average time m is 1.0 ms, the standard deviation σ is 1.0, and a necessary time of an interruption process in the CU 20 is 0.2 ms (a sum of 0.7 ms is set including the transmission time 0.5 ms of the interruption request signal from the NM 30 to the CU 20). As a comparative example (in order to detect that the NM 30 is in the command-unprocessable state since the NAND flash memory 32 is executing the garbage collection process), it is assumed that the restriction time treated as time-out is set to 100 ms in the CU 20.

In this case, the restriction time in which the NM 30 detects the garbage collection process by the NAND flash memory 32 is 4.0 ms according to the foregoing m+3σ. This is 5.2 ms (0.5 ms+4.0 ms+0.7 ms) from the viewpoint of the CU 20. Also, it can be detected that the NM 30 is in the command-unprocessable state since the NAND flash memory 32 is executing the garbage collection process. That is, in the storage system 1 according to the present embodiment, the CU 20 is assumed to be able to detect that the NM 30 is in the command-unprocessable state in a considerably shorter time than 100 ms of the comparative example.

In the related art, the CU 20 can merely assume an approximate time in which the NAND flash memory 32 ends the garbage collection process. In the storage system 1 according to the present embodiment, however, the time can be detected as 1.7 ms which is a response time (1 ms) of a blocked command+notification time (0.7 ms) from NM 30 to the CU 20 from the end of the garbage collection process.

The NM-FW driver 201 may continuously measure the response time for each kind of commands during activation, appropriately calculates the average time m and the standard deviation σ described above, and dynamically updates the restriction time (m+3σ).

Figure 17:
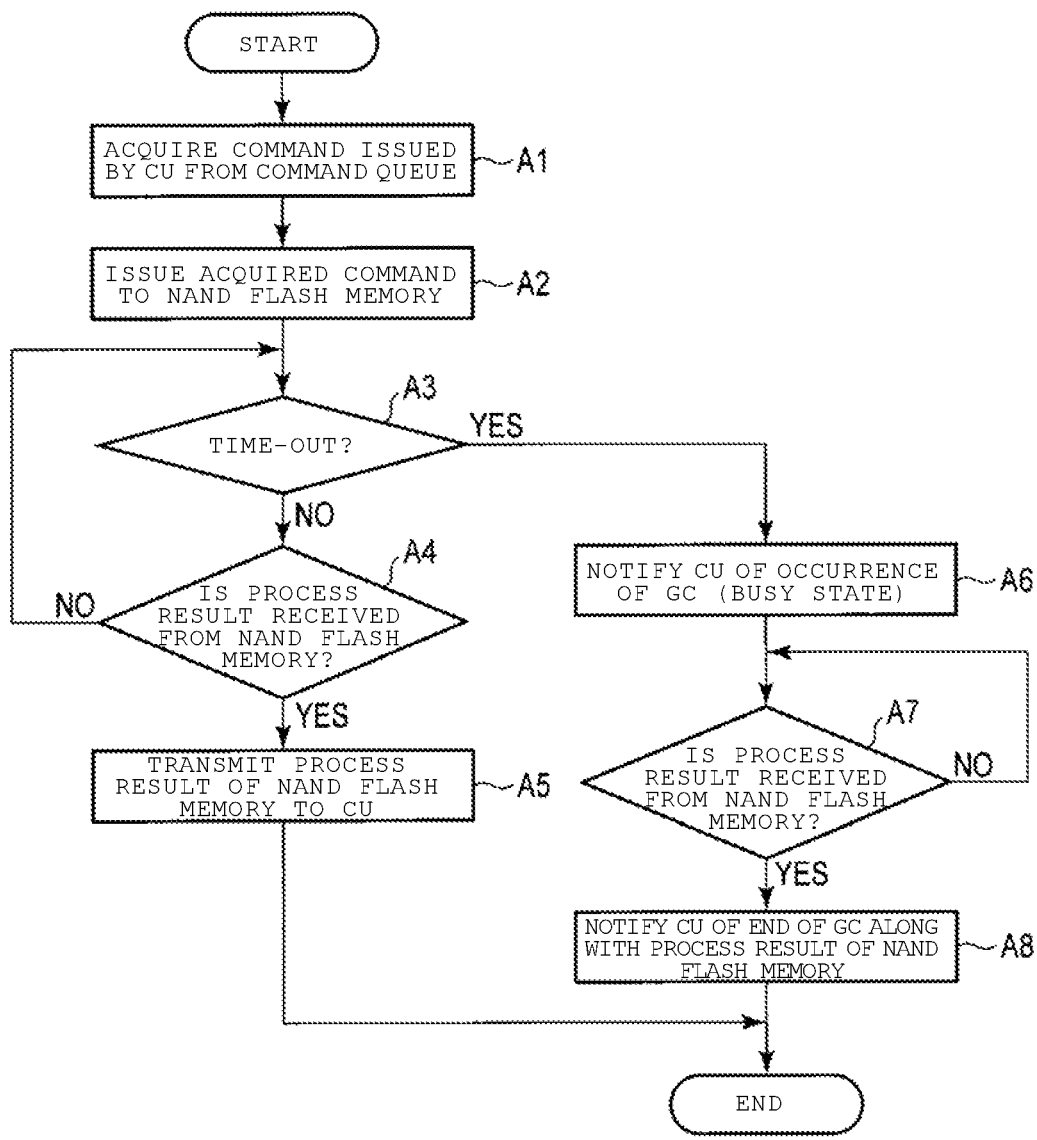
FIG. 17 is a flowchart illustrating the flow of an operation of the NM (NM-FW driver) of the storage system according to the second embodiment.

FIG. 17 is a flowchart illustrating the flow of an operation of the NM 30 (the NM-FW driver 201).

The NM-FW driver 201 extracts a command issued by the CU 20 from the command queue 201A (step A1). The NM-FW driver 201 issues the extracted command to the NAND flash memory 32 (step A2).

The NM-FW driver 201 monitors whether a predetermined restriction time elapses after the command is issued to the NAND flash memory 32 (step A3). When the restriction time does not elapse (NO in step A3), the NM-FW driver 201 then determines whether the response (the process result) to the issued command can be obtained from the NAND flash memory 32 (step A4). When the response can be obtained (YES in step A4), the NM-FW driver 201 transmits the response (the process result) to the CU 20 (step A5). When the command may not be obtained (NO in step A4), the process returns to step A3.

When the predetermined restriction time elapses without acquiring the response (the process result) to the issued command from the NAND flash memory 32 (YES in step A3), the NM-FW driver 201 transmits notification that the NAND flash memory 32 of the self-NM 30 is executing the garbage collection process to the CU 20 (step A6). The NM-FW driver 201 waits to obtain the response (the process result) to the issued command from the NAND flash memory 32 (step A7). When the response can be obtained (YES in step A7), the response (the process result) is transmitted to the CU 20 and notification that the garbage collection process ends is transmitted to the CU 20 (step A8).

Figure 18:
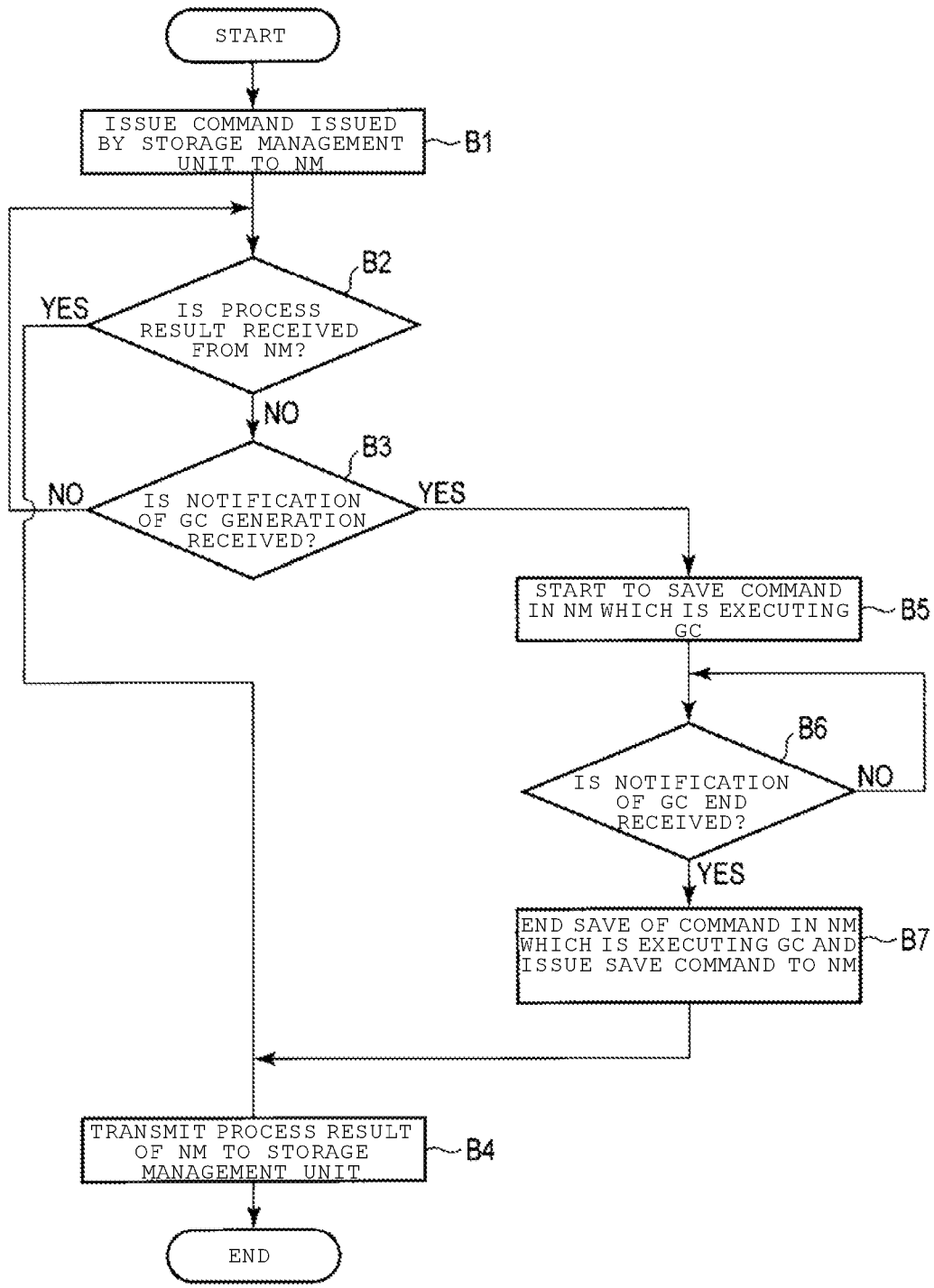
FIG. 18 is a flowchart illustrating the flow of an operation of the CU (CU-FW driver) of the storage system according to the second embodiment.

FIG. 18 is a flowchart illustrating the flow of an operation of the CU 20 (the CU-FW driver 103).

The CU-FW driver 103 issues the command issued by the storage management unit 102 to the NM 30 (step B1). The CU-FW driver 103 determines whether the response (the process result) to the issued command can be obtained from the NM 30 (step B2). When the response may not be obtained (NO in step B2), the CU-FW driver 103 then determines whether the NM 30 issuing the command notifies of the CU-FW driver 103 that the NAND flash memory 32 is executing the garbage collection process (step B3). When the CU-FW driver 103 is not notified (NO in step B3), the process returns to step B2. When the response (the process result) to the issued command can be obtained from the NM 30 (YES in step B2), the CU-FW driver 103 transmits the response (the process result) to the storage management unit 102 (step B4).

When the CU-FW driver 103 is notified that the NAND flash memory 32 is executing the garbage collection process (YES in step B3), the CU-FW driver 103 suspends issuing of the command to the NM 30 which is a notification source, that is, starts saving the command in the command save area 103A (step B5). Thereafter, the CU-FW driver 103 determines whether the CU-FW driver 103 is notified that the garbage collection process ends (step B6). When the CU-FW driver 103 is notified (YES in step B6), the CU-FW driver 103 ends the save of the command in the NM 30 which is the notification source and issues the command saved in the command save area 103A (step B7). At this time, the CU-FW driver 103 transmits the response (the process result) obtained from the NM 30 to the storage management unit 102 (step B4).

As described above, in the storage system 1 according to the present embodiment, the CU 20 and the NM 30 cooperate to prevent the issuing of the command to the NM 30 by the CU 20 while the NAND flash memory 32 is executing the garbage collection process, and thus it is possible to suppress degradation of the performance of the entire storage system 1.

In the present embodiment described above, by transmitting the interruption request signal from the NM 30 to the CU 20, the CU 20 is notified that the NM 30 is in the command-unprocessable state since the NAND flash memory 32 is executing the garbage collection process. Instead of transmitting the interruption request signal, the NM 30 detecting that the NAND flash memory 32 is executing the garbage collection process may notify the CU 20 that the NM 30 is in the command-unprocessable state since the NAND flash memory 32 is executing the garbage collection process, for example, by storing information indicating that the NAND flash memory 32 is executing the garbage collection process in an internal register accessible via a bus line such as an I2C bus from the CU 20. In this case, the CU 20 detects that the NM 30 is in the command-unprocessable state since the NAND flash memory 32 is executing the garbage collection process by cyclically accessing the internal register of the NM 30.

In the present embodiment described above, when the NM 30, more specifically, the NM-FW driver 201, issues a command to the NAND flash memory 32 and the response (the process result) to the command may not be obtained over m+3σ, the NM 30 determines that the NAND flash memory 32 is executing the garbage collection process. As the method of determining the restriction time, setting of m+3σ, as described above, is effective when the CU 20 detects that the NM 30 is in the command-unprocessable state since the NAND flash memory 32 is executing the garbage collection process, irrespective of notification from the NM 30, for example, the restriction time is set for a command issued to the NM 30 by the CU-FW driver 103.

In this case, a time period from a time in which the CU-FW driver 103 issues a command to the NM 30 to a time when the CU-FW driver 103 acquires a response (process result) to the command from the NM 30 is measured, and an average value (average time m) and a standard deviation σ are calculated.

Even when not the CU-FW driver 103 but the application unit 101 or the storage management unit 102 detects that the NM 30 is in the command-unprocessable state since the NAND flash memory 32 is executing the garbage collection process and the restriction time is set in the application unit 101 and the storage management unit 102, setting of m+3σ is effective as the method of determining the restriction time, as described above.

In the present embodiment described above, the NM 30 notifies the CU 20 that the NM 30 is in the command-unprocessable state since the NAND flash memory 32 is executing the garbage collection process. As a factor in which the NM 30 is in the command-unprocessable state, for example, a lock acquisition standby for updating data can be considered in addition to the garbage collection process by the NAND flash memory 32. As described above, the CU 20 and the NM 30 may cooperate to notify the CU 20 that the NM 30 is in the command-unprocessable state, as such a factor.

The various functions described in the present embodiment may be achieved by a circuit (processing circuit). An example of the processing circuit includes a programmed processor such as a central processing unit (CPU). The processor executes the described functions by executing a computer program (instruction group) stored in a memory. The processor may be a microprocessor including an electric circuit. Examples of the processing circuit include a digital signal processor (DSP), an application specific integrated circuit (ASIC), a microcontroller, a controller, and other electric circuit components. Each of the other components other than the CPU described in the present embodiment may also be achieved by a processing circuit.

Various processes according to the present embodiment can be achieved by a computer program. Therefore, by installing and executing the computer program on a computer via a computer-readable storage medium storing the computer program, it is possible to easily achieve the same advantages as those of the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system comprising:
a plurality of nodes, each of the nodes including a nonvolatile storage device that includes a main storage region and a temporary storage region; and
a connection unit directly connected to at least one of the nodes and configured to determine a target node responsive to a write request generated by a host,
determine a address of a main storage region of the target node for storing data requested by the write request,
determine whether or not the target node is busy,
responsive to determining that the target node is busy, determine an address of a temporary storage region of a non-busy node for temporarily storing the data based on the determined address of the main storage region of the target node and a size of the temporary storage region of the non-busy node, and output a write command directed to the non-busy node such that the data requested by the write request are written at the determined address of the temporary storage region in the non-busy node,
store, in a memory thereof, correspondence between the determined address of the main storage region of the target node and the determined address of the temporary storage region of the non-busy node, and
responsive to passing of a reference time period after determining that the target node is busy, read the correspondence for copying the data and output a copy command directed to the non-busy node such that the data written in the non-busy node are copied to the target node.

2. The storage system according to claim 1, wherein the connection unit is further configured to
output a write command directed to the target node such that the data requested by the write request are written in the target node, responsive to determining that the target node is not busy,
count a time period for the target node to complete writing the data, and
determine that the target node is busy responsive to determining that the counted time period is greater than a second reference time period.

3. The storage system according to claim 2, wherein the connection unit is further configured to determine the target node for each divided unit of data requested to be written by the write request, and carry out data writing in the target node or the non-busy node for each of the target nodes.

4. The storage system according to claim 3, wherein the connection unit sequentially determines the target node for said each divided unit of the data, one node at a time.

5. The storage system according to claim 1, wherein the connection unit determines the address of the temporary storage region of the non-busy node, using a reminder obtained by dividing the address of the main storage region of the target node by the size of the temporary storage region of the non-busy node.

6. The storage system according to claim 1, wherein the connection unit is further configured to activate a flag associated with the correspondence stored in the memory, in accordance with output of the write command directed to the non-busy node, and deactivate the flag in accordance with output of the copy command directed to the non-busy node.

7. The storage system according to claim 1, wherein the connection unit is further configured to maintain, in a memory thereof, data write latency of each node, and select one of non-busy nodes that has a least data write latency when the write request is received, as the non-busy node to which the write command is directed.

8. A method for processing a request generated by a host, by a connection unit directly connected to at least one of a plurality of nodes, each of the nodes including a nonvolatile storage device that includes a main storage region and a temporary storage region, the method comprising:
determining a target node responsive to a write request generated by the host;
determine a address of a main storage region of the target node for storing data requested by the write request;
determining whether or not the target node is busy;
responsive to determining that the target node is busy, determining an address of a temporary storage region of a non-busy node for temporarily storing the data based on the determined address of the main storage region of the target node and a size of the temporary storage region of the non-busy node, and outputting a write command directed to the non-busy node such that the data requested by the write request are written at the determined address of the temporary storage region in the non-busy node; and
responsive to passing of a reference time period after determining that the target node is busy, reading the correspondence for copying the data and outputting a copy command directed to the non-busy node such that the data written in the non-busy node are copied to the target node.

9. The method according to claim 8, further comprising:
outputting a write command directed to the target node such that the data requested by the write request are written in the target node, responsive to determining that the target node is not busy;
counting a time period for the target node to complete writing the data; and
determining that the target node became busy responsive to determining that the counted time period is greater than a second reference time period.

10. The method according to claim 9, wherein the determining of the target node is carried out for each divided unit of data requested to be written by the write request, so that each divided unit of the data is written in the corresponding target node or the corresponding non-busy node.

11. The method according to claim 10, wherein the target node for said each divided unit of the data is sequentially determined, one node at a time.

12. The method according to claim 8, wherein the address of the temporary storage region of the non-busy node is determined using a reminder obtained by dividing the address of the main storage region of the target node by the size of the temporary storage region of the non-busy node.

13. The method according to claim 8, further comprising:
activating a flag associated the correspondence stored in the memory, in accordance with output of the write command directed to the non-busy node; and
deactivating the flag in accordance with output of the copy command directed to the non-busy node.

14. The method according to claim 8, further comprising:
maintaining, in a memory thereof, data write latency of each node; and
selecting one of non-busy nodes that has a least data write latency when the write request is received, as the non-busy node to which the write command is directed.

* * * * *